(12) United States Patent
Komro, Sr.

(10) Patent No.: US 7,089,955 B1
(45) Date of Patent: Aug. 15, 2006

(54) RECREATIONAL VEHICLE LOW TEMPERATURE WATER SUPPLY WARMING SYSTEM

(76) Inventor: Grant T. Komro, Sr., 1421 Division St., Green Bay, WI (US) 54303

( * ) Notice: Subject to any disclaimer, the term of this patent is extended or adjusted under 35 U.S.C. 154(b) by 0 days.

(21) Appl. No.: 11/186,966

(22) Filed: Jul. 20, 2005

(51) Int. Cl.
*F16K 49/00* (2006.01)
*E03B 7/07* (2006.01)

(52) U.S. Cl. .................. 137/301; 137/334; 137/341; 137/563; 137/899; 417/32

(58) Field of Classification Search ........... 137/301, 137/334, 337, 563, 899, 341; 417/32
See application file for complete search history.

(56) References Cited

U.S. PATENT DOCUMENTS

| | | | | | |
|---|---|---|---|---|---|
| 2,840,101 A | * | 6/1958 | Saylor | ............... | 137/335 |
| 3,929,154 A | * | 12/1975 | Goodwin | ............... | 137/1 |
| 4,286,617 A | * | 9/1981 | Bedient | ............... | 137/334 |
| 4,298,021 A | * | 11/1981 | Bozeman | ............... | 137/334 |
| 4,531,538 A | * | 7/1985 | Sandt et al. | ............... | 137/334 |
| 4,672,990 A | * | 6/1987 | Robillard | ............... | 137/59 |
| 5,261,443 A | * | 11/1993 | Walsh | ............... | 137/337 |
| 5,830,380 A | * | 11/1998 | Cook | ............... | 252/79 |
| 6,196,246 B1 | * | 3/2001 | Folsom | ............... | 137/2 |

* cited by examiner

*Primary Examiner*—A. Michael Chambers
(74) *Attorney, Agent, or Firm*—Jeffrey S. Sokol; Cook & Franke S.C.

(57) ABSTRACT

The present recreational vehicle water warming and circulating system uses the heated water in the water heater to heat the on-board water supply when the outside air temperature drops below the freezing point of water. The system includes a holding tank for containing a majority of the on-board water supply, and heated and cold loops that supply heated and cold water to various fixtures in the recreational vehicle. When temperature sensors sense a potentially freezing condition, a control circuit opens one or more solenoid valves to open the one or both loops to return undispensed heated or cold water to the holding tank. The control circuit closes the solenoid valves when the potentially freezing condition is no longer detected by the temperature sensors.

23 Claims, 12 Drawing Sheets

FIGURE 5A

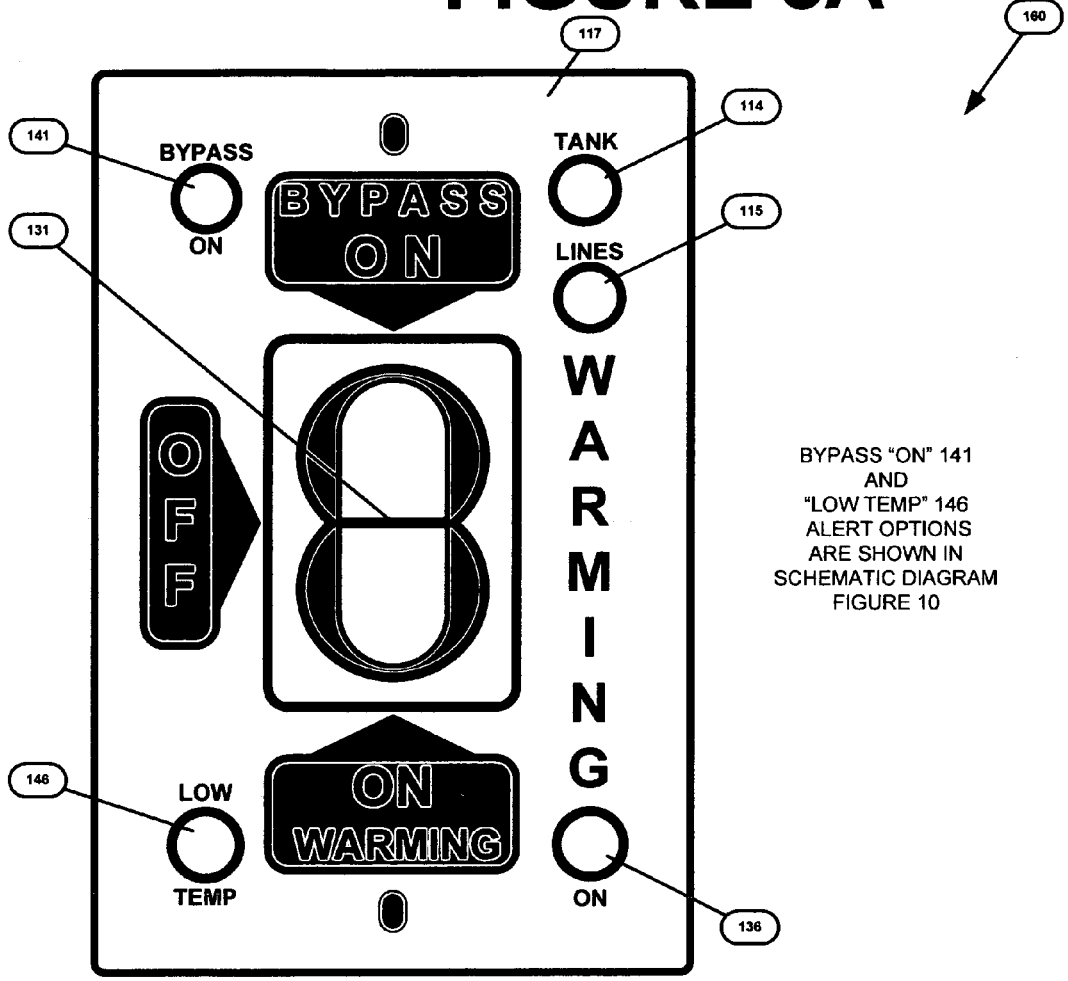

BYPASS "ON" 141
AND
"LOW TEMP" 146
ALERT OPTIONS
ARE SHOWN IN
SCHEMATIC DIAGRAM
FIGURE 10

| DISPLAY INDICATOR LIGHTS ▬ = NON-ILLUMINATED ☐ = ILLUMINATED | | | | | SYSTEM STATUS |
|---|---|---|---|---|---|
| ▬ | ▬ | ▬ | ▬ | ☐ | WARMING SYSTEM "OFF" |
| ▬ | ▬ | ▬ | ▬ | ☐ | WARMING SYSTEM "ON" |
| ▬ | ▬ | ☐ | ▬ | ☐ | "TANK WARMING" |
| ▬ | ▬ | ▬ | ☐ | ☐ | "WATER LINES WARMING" |
| ▬ | ▬ | ☐ | ☐ | ☐ | BOTH "TANK" AND "LINES" ARE WARMING |
| ▬ | ☐ | ▬ | ▬ | ▬ | BYPASS "ON" ALERT FOR "WINTERIZING OR FLUSHING" |
| ☐ | ▬ | ▬ | ▬ | ▬ | WARMING SYSTEM "OFF" (PUMP "ON" low temperature alert) |
| LOW-TEMP | BYPASS | TANK "W" | LINE "W" | SYS. "ON" | INDICATOR LIGHT DESCRIPTION |

FIGURE 5B

RECREATIONAL VEHICLE LOW TEMPERATURE WATER SUPPLY WARMING SYSTEM

BACKGROUND OF THE INVENTION

For a significant part of the year, large areas in North America have temperatures that fall well below freezing at night (10 or 20 degrees) but are well above freezing during the day. This common situation greatly limits the use of the great majority of Recreational Vehicles (RVs) with on-board water systems such as motor homes, camper trailers, travel trailers, truck slide-ins and other mobile recreational living structures and units. When the outside temperature drops below freezing, the water system must be drained to prevent damage to the pipes, tanks, water fixture(s) and other plumbing components. Very few options are available to avoid this damage. The three basic options are a) drain the water system and go without running water, b) go south to a warmer climate, or c) put the unit in storage.

Some Recreational Vehicles are equipped with dedicated heating devices such as an electric holding tank heaters and pipe heaters. These electric heating devices use 120V AC or 12V DC power. Operating these heating devices on 120V AC requires an external power source or running an on-board generator that consumes the limited on-board fuel supply. Running the heaters on 12V DC puts a significant load on the on-board battery system that is also required to operate essential on-board equipment and devices. Some larger units employ a multiple battery system that will handle heavier electrical demands but this is costly, requires more space, more weight, more maintenance, and only increases operating time by a relatively small factor. This type of low temperature protection is generally limited to larger class "A" motor homes that are equipped with high generator capacity and much larger holding tanks than are found in most RV units.

Some Recreational Vehicles locate holding tanks and run all water supply lines inside the warmed interior. This method reduces valuable interior space. One manufacturer uses a brute force approach by ducting part of the hot air output from the on-board furnace to an enclosed holding tank area and water supply line routing areas. This furnace duct method, according to the manufacturer, can provide freeze protection down to −30° F. For this extreme low temperature protection the manufacturer uses a much higher capacity furnace, thicker walls to accommodate additional insulation to provide a higher "R" value then would be needed for less extreme temperature conditions and that again reduces interior space. Another major disadvantage for this method is higher consumption of the limited on-board fuel and electrical supply. The manufacturer suggests that the unit be connected to external LP gas cylinders and connected to external 120V AC when the unit is unoccupied for any extended period of time between outings.

Winterizing the water system when traveling because the outside temperature drops below freezing is troublesome, time consuming and a costly chore. This same onerous situation can arise when parking or storing the unit for a few days or weeks between outings. The few Recreational Vehicle units that offer any real low temperature protection are notably more expensive and really not practical for most Recreational Vehicle owners. Unless the Recreational Vehicle is at a location where there is external electrical power the Recreational Vehicle must continuously run an electrical generator consuming limited on-board fuel supplies. This is a major problem for buyers who must consider the investment verses real use and limited use or opt in favor of other less troublesome and less limiting options.

For the few people who would even consider using the Recreational Vehicle for ice-fishing, hunting or exploring especially when the temperature is −30° F. below or even 0° F. outside there is a manufacturer who can cater to their extreme demands. There seems to be no practical solution or cost effective options available to the vast majority of Recreational Vehicle owners that would allow them to use and enjoy their units to the fullest by extending the recreational season, not by just a few days or weeks but months. Because the temperatures may drop below freezing for a few hours or even a few days restricts Recreational Vehicle owners to where and when they go.

As many people put it: "you can stay hundreds of days in very nice hotels or cabins with all the comforts and amenities for the cost of most RV units without being so limited as to when you go or where you go." Some people say, "just go south when it gets cold". That may be an option for retired people but most people who own units or would buy a nice Recreational unit, work and have families and can not go south. For the better part of the year these units have to be winterized, parked and sit until summer approaches. Even many class "B" and "C" motor homes are relegated to less than a convenient passenger vehicle which for a very few people may help them justify a more expensive motorhome over the purchase of less costly trailers, fifth-wheels or slide-ins. Many retired people purchasing a modest Class "A" motor home, a large trailer or large fifth wheel, want a unit with lots of room because as they go south for six month of the year. Although many of these people envy the freedom and mobility offered by smaller recreational trailers, fifth-wheels, slide-ins and smaller motorhomes they are still faced with going south for the better part of the year because of the low temperature limitations. Many people settle for less then they want, less then they can afford and less then they deserve because of cold weather.

Besides having to be cost effective for both the manufacturer and customer, the system must extend the full usefulness of the units' water supply system to a more functional and reasonable low temperature range. To design a RV water freeze protection system that is practical, cost effective and extends the RV season by months the on-board water warming and circulating system included the following criteria:

A) Reasonable low temperature protection should prevent freezing in static air temperatures down in the single digits range and down into the 10 to 20° F. range when moving at highway speeds of 55 to 75 MPH with wind chill affects.

B) Utilization of existing on-board equipment such as the water heater, water pump and water system supply lines.

C) Efficiency and effectiveness of the system is a critical design factor because of limited on-board electrical and fuel supplies.

D) As many parks have quiet time from 11 PM to 7 AM the system should be able to operate independently for a minimum of 8 hours, utilizing only the on-board battery and LP gas while providing freeze protection down to at least 20° F. outside air temperature without requiring running a generator or the need to be connected to any external electrical power or gas source.

E) Using the existing water pump to provide pressure for the water warming circulating lines.

F) Using the existing gas/electric water heater will provide the source of hot water for warming the water holding tank and also provide warming of the water supply system lines.

G) Many manufacturers use custom shaped fresh water holding tanks that are expensive therefore any method of warming the tank water and monitoring the water temperature should be accomplished with little or no modification.

H) The fresh water holding tanks water temperature should be monitored by a thermostat located in the tank or if applicable attached through or to the outside of the tank. When the tanks water temperature drops below the set point, the thermostat will close and power a solenoid valve that opens the hot water circulating line which empties into the holding tank and warms the holding tank water. The thermostat low temperature close point (as an example) set at 45° F. with an open differential of 5° F. minimum to reduce system cycling.

I) Protecting the water supply lines includes the pump and the pumps intake water line that runs to the fresh water holding tank.

J) The circulating warming and water supply lines should be bundled, wrapped in a plastic guard or shroud and then insulated to provide efficient thermal convection warming.

K) The bundled water line routing should be able to follow existing water line routing without major routing changes. Many manufacturers connect the water fixtures by tapping off the main hot and cold water header/supply lines that in most plumbing configurations do run outside of the insulated warmed interior or do not run close to water fixtures. The warming system requires that any water lines running outside between water fixtures or devices should be looped inside the warmed interior then routed back outside while maintaining a bundled configuration.

L) Heat loss will differ between the fresh water holding tank and the bundled water supply lines therefore a second water circulating warming loop controlled by a separate solenoid valve and thermostat is required when only the water lines need warming. Using the warm holding tank water to warm the water lines will prevent over heating of the holding tank water and reduce water heater cycling and fuel consumption that would result if only the hot water tank warming line was used.

M) Preventing water fixtures from freezing inside the unit requires a furnace with the thermostat set appropriately.

N) The system should be able to operate without using any on-board fuel or battery power when the unit is plugged into an external electrical power source. This is accomplished by equipping the unit with a gas/electric water heater and power converter/charger that automatically senses and switches to external electrical power when the unit is plugged into an external power source. This would also require using a small 120V AC electrical space heater inside the unit to warm the interior instead of the LP gas furnace when plugged into external electric power source in moderate freezing outside temperature. This would reduce the need to run the LP gas furnace except for very cold temperatures.

O) Simple customer control of system.

P) Emphasis on cost of material and parts.

Q) Emphasis on installation labor cost.

R) Minimum modification to existing water system line routing.

S) Benefits to customers, sales and marketing.

Conventional Recreational Vehicle Water System

A general representation of a conventional water supply system plumbing scheme 10 for a RV unit 4 is shown in FIG. 7. The system 10 includes a fresh water holding tank 12, a water heater 14, a water pump 16, several water fixtures 20, hot water header/supply line tubing 32, cold water supply line tubing 42, hot water appliance branch line 34, and cold water branch line 44. These plumbing components are arranged and connected to illustrate the basic principles of a conventional RV water plumbing system. It should be understood that there are many alternate existing water plumbing system configurations and that the application of the present invention is not limited to the water system configuration illustrated. The present invention applies to other existing RV water-plumbing systems configurations with alternate water fixture locations and equipment connection points.

The RV unit 4 has an interior habitation area or inside environment 206 as shown in FIG. 9. To prevent the interior water fixtures 20 from freezing, the recreational vehicle with an electrical space heater and/or furnace is required to be "ON," with the furnace thermostat set to a temperature adequate to prevent freezing inside.

Heat loss through ceiling and walls should not be a problem for reasonably insulated units to provide freeze protection within reasonable temperature objectives. Heat loss through the windows in the units living and sleeping area can be easily managed by curtains.

Heat loss through the cab areas of class "B" and "C" motor homes can be managed by curtains closing off or covering the front cab area side and windshield windows and/or closing the dividing door(s) that separate the cab area if units are so equipped. Heat loss through the ceiling vent(s) is a definite concern that can be easily resolved by using any of the off-the-shelf products designed for summer and winter thermal heat or cooling loss.

Because the larger class "A" motor homes are equipped with a larger, high capacity furnace and can have large insulated and heated basement areas for storage, equipment, plumbing lines and holding tanks, the warming system may not be applicable. The warming system 50 may be applicable for class "A" units that have exposed plumbing lines and/or fresh water holding tanks.

If window heat loss and/or condensation is a concern, there are better alternatives to double glazed windows. Consider clear "Astro Foam™", a material developed by NASA, which is placed between two layers of glass or plastic that can provide insulating factors in excess of R-20. This would be an excellent product for recreational vehicle units as there is no gas or vacuum between the two layers which makes these windows extremely durable. The "Astro Foam™" insulated window is a new product that may be available only through one or two manufacturers at this time.

Some manufacturers insulate primarily for sound and noise reduction but many units are equipped with a furnace (not shown) and have an air-conditioner (not shown) which should be adequate for the warming system 50 to provide low temperature protection. For some RV units 4 the "R" value in regards to temperature may be too low to maintain an interior environment 206 temperature needed when plugged into and using only external electrical power system without running the furnace and consuming limited on board fuel. Keeping the interior environment 206 warm is required for protecting the drain traps and water fixtures 20 from freezing when the unit is parked for a few days or weeks between trips.

Even these low "R" value units 4 may provide interior water system freeze protection down into the low 20° F. range for several hours when equipped with the warming system 50 and using only external electrical power and a small conventional plug-in electric space heater (not shown). Even this limited protection is considered by many RV owners to be a major improvement even though these units would not achieve the full benefit of much lower temperatures the warming system could provide.

For low "R" value units the manufacturers could significantly increase the "R" value by using ultra thin "Astro-foil™" type insulation between the interior covering 201 and the frame 202. "Astro-foil" is just ¼" thick and when properly installed, could offers an additional R-15 while providing an excellent vapor barrier. As "Astro-foil" is basically very thin plastic bubble material laminated on both sides with reflective foil and requiring little, if any, modifications to attach cabinets or interior covering 201 to the frame.

A well insulated RV unit is not required for the water warming and circulating system 50 to operate. The "R" value is referenced in regards to the efficiency of providing the lowest outside environment 208 temperature freeze protection of the water fixtures and plumbing components located within the unit interior environment 206. An adequately insulated RV unit will maximize the freeze protection benefit of the warming system capability to lower outside air temperature when the RV unit is connected to external electrical power while utilizing only a small electric space heater (not shown) and the electric water heater appliance 14.

When unoccupied and parked for extended periods of time the RV units' furnace thermostat (not shown) should be set to assist the electric space heater (not shown) when the outside temperature may fall below the ability of the space heater to keep the water fixtures and plumbing components from freezing. The furnace would also provide a backup in the event of a power or electric space heater failure as the warming system can operate from only the on-board battery and fuel supply.

Many RV owners frequently use a small plug-in electric space heater (not shown) when their RV unit 4 is connected to external 120V AC power for warming the interior 206 on cold and cool days rather than running the gas furnace. If the unit 4 is adequately insulated and common sense procedures are followed such as leaving cabinet door(s) open under the sink and the shower compartment door open when using the electrical heater this will help protect the water fixtures from freezing. This should provide protection from freezing when the owner parks the unit 4 next to the their house for a few nights or weeks before going on another trip. If the owner parks for a night or so when it might get too cold to keep the unit 4 warm with just the electrical heater, the furnace may be turned on and the thermostat may be set to keep the interior 206 warm.

The present invention is intended to solve these and other problems.

BRIEF DESCRIPTION OF THE INVENTION

The present invention pertains to an integrated, closed loop water warming and circulating system 50, 150 and 200 for the on-board water system of a recreational vehicle. The system is practical, efficient and cost effective for low temperature protection of the on-board fresh water supply system.

The warming system 50 deals only with the fresh water supply system, as the "gray" and "black" water holding tanks are easily managed by adding some standard RV anti-freeze to these tanks. For simplicity, system 50 also refers to embodiments 150 and 200.

For recreational vehicles 4 equipped with city water inlet line connector 28 and exterior shower 25, these items can be easily protected by simply adding standard water supply tubing, tee connectors 26, two manual 3-way valves 186 and 187 and a drain valve 174 or faucet to isolate and drain these items.

This system relies on an efficient source of hot water, some additional water line tubing, two thermostatically controlled solenoid valves 104 and 105 and a simple electrical control circuit 110.

One advantage of the present integrated warming system 50 is that it does not require relocating any of the holding tanks.

Another advantage of the present integrated warming system is that it should not require the water supply lines to be rerouted or routed only through the warmed interior.

A further advantage of the present integrated warming system is that it does not require any special electrical heating devices or special furnace ducting.

A still further advantage of the present integrated warming system is that it requires little additional water line tubing as much of the warming system water circulating lines 60 and 70 use the existing water supply system lines.

A still further advantage of the present integrated warming system 50 is that when the recreational vehicles' water heater appliance 14 is a combination gas and electric, no on-board fuel is required when the unit is plugged into an external 120V AC power source. When using external electrical power to heat the water required for the warming system, and by using a small plug-in electric space heater (not shown) to warm the interior, as many owners do, instead of running the on-board furnace, no on-board electrical power or fuel will be required.

The present warming system eliminates the cold weather ordeal by providing the following additional advantages:

A. The freedom to travel with all the amenities, comfort and conveniences without worrying about the water system freezing.

B. No more having to do without running water or having to carry bottles or containers of water on board in cold weather and then removing them when the unit is unoccupied.

C. Extending the travel season and areas and still having the most basic and essential convenience, "running water".

D. Having the "luxury" of not winterizing the unit when parking it for days or weeks between outings during cold weather.

E. Having the option to use 120V external power to provide low temperature protection without using on-board fuel or battery.

F. Having only to winterize for long-term storage or extreme low temperature conditions. The low temperature protection limits can vary from model to model and/or depending on the manufacturers objectives.

G. Simple plumbing modification and owner procedure is required to prep the city water inlet line 27 and exterior shower 25 for cold weather protection if units are so equipped.

H. Winterizing is simple and easily done with units equipped with the warming system option.

I. Simple and Easy single switch control to activate the warming system.

J. Selling units without a warming system would be difficult considering why and what people purchase them for.

K. Class "B" & "C" motor homes including camper trailers, fifth wheels, and slide-ins equipped with the warming system offers greater freedom of where and when people can travel.

L. The warming system is cost effective because it can be applied to most units with little modification or engineering.

The present integrated closed loop circulating system resolves the problem of cold weather protection of the fresh water-holding tank 12, water pump 16 and water supply plumbing lines, and provides the following advantages:

1) Prevent freezing at reasonable low temperatures of the on-board water supply system. A target protection range between zero degrees in static air and 10 to 20° F. for dynamic airflow (wind chill at highway speeds).

2) Warming of the water in the fresh water holding tank.

3) Warming of the water pump intake supply water line 15 running between the water pump 16 and the fresh water holding tank 12.

4) Warming of the on-board water supply lines running between the water pump 16, water fixtures 20 and water heater appliance 14.

5) Warming and protection of water supply lines running outside 208 of the heated interior 206 of the unit.

6) Warming of the water pump and associated plumbing connector.

7) Isolating or warming exterior shower 25.

8) Isolating or warming on-board city water supply line 27.

9) Greatly extending seasonal use by months, not just a few days or weeks.

10) Providing greater freedom to chose when to travel and where to go.

11) Freedom from worry of the temperature dropping below freezing overnight or for days resulting in costly damage and repair.

12) Totally eliminating the need to winterize for many people who live in areas where the temperature never falls below the warming system lower temperature limits, as set by the manufacturer, by simply connecting the unit to an external electrical power outlet.

The existing water lines of a conventional Recreational Vehicle unit may need to be rerouted to allow for the return lines forming the warming loops 60 and 70 of the present invention depending on the room and accessibility of the original line runs.

If the water pump is located within the unit interior 206 where it is not exposed to freezing temperatures, it may require little if any additional insulation and circulating warming line protection. If the water pump is located outside the insulated and heated interior, then the pump, interconnecting tees, check valve and lines must be protected by insulating the areas 176 where they are located and placing or coiling the warming lines 60 and 70 around the devices.

Other aspects and advantages of the invention will become apparent upon making reference to the specification, claims and Figures.

BRIEF DESCRIPTION OF THE FIGURES

FIG. 5A shows the switch plate layout for the Master Control circuit.

FIG. 5B shows system status display indicator light chart for the Master Control circuit.

DESCRIPTION OF THE PREFERRED EMBODIMENTS

While this invention is susceptible of embodiment in many different forms, the figures shown and the specification describes in detail a preferred embodiment of the invention. It should be understood that the drawings and specification are to be considered an exemplification of the principles of the invention. They are not intended to limit the broad aspects of the invention to the embodiment illustrated.

Figure 1:
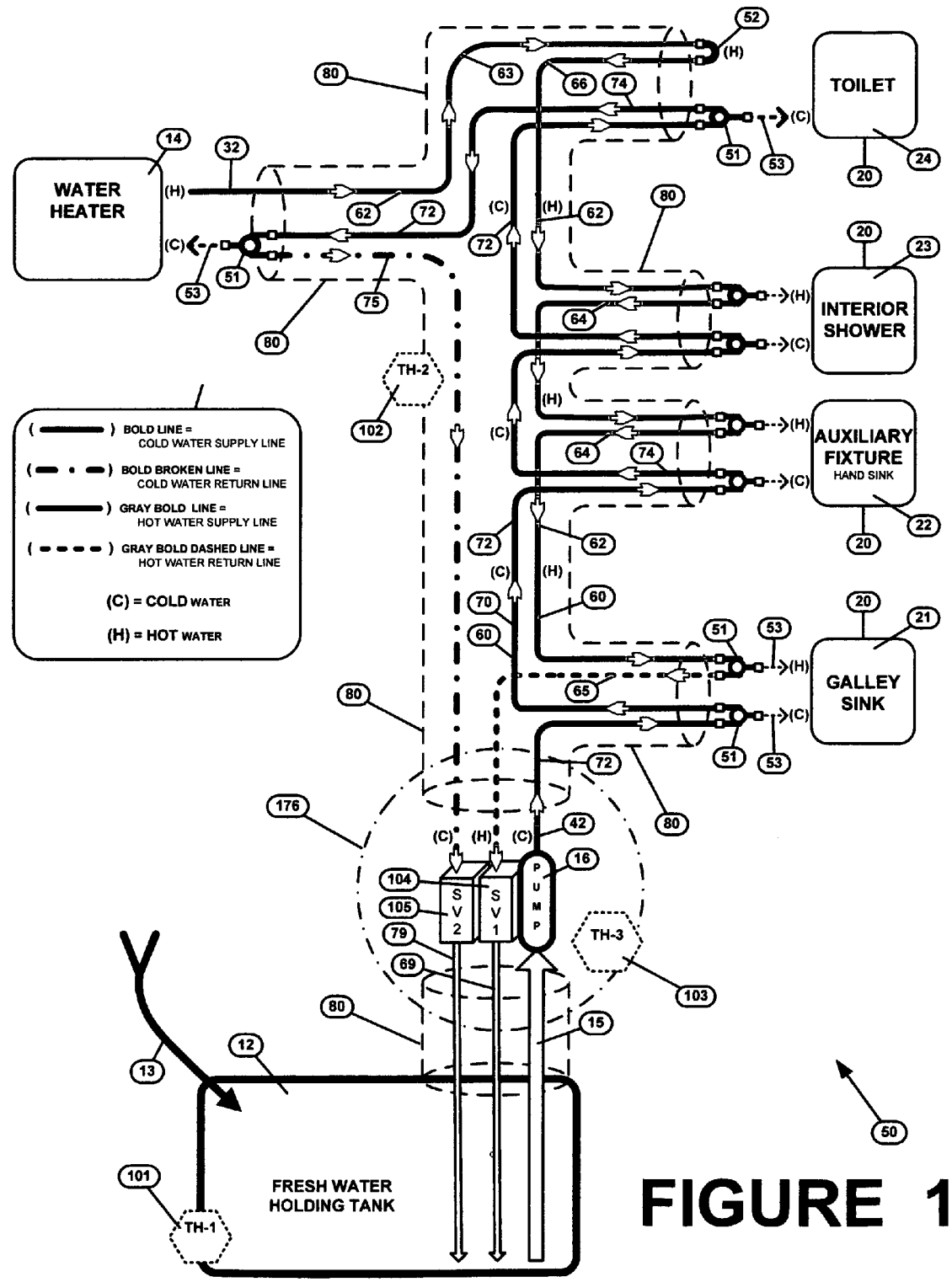
FIG. 1 is a plumbing and equipment schematic showing the flow paths for the present inventive recreational vehicle water supply Warming System (50).
Figure 4:
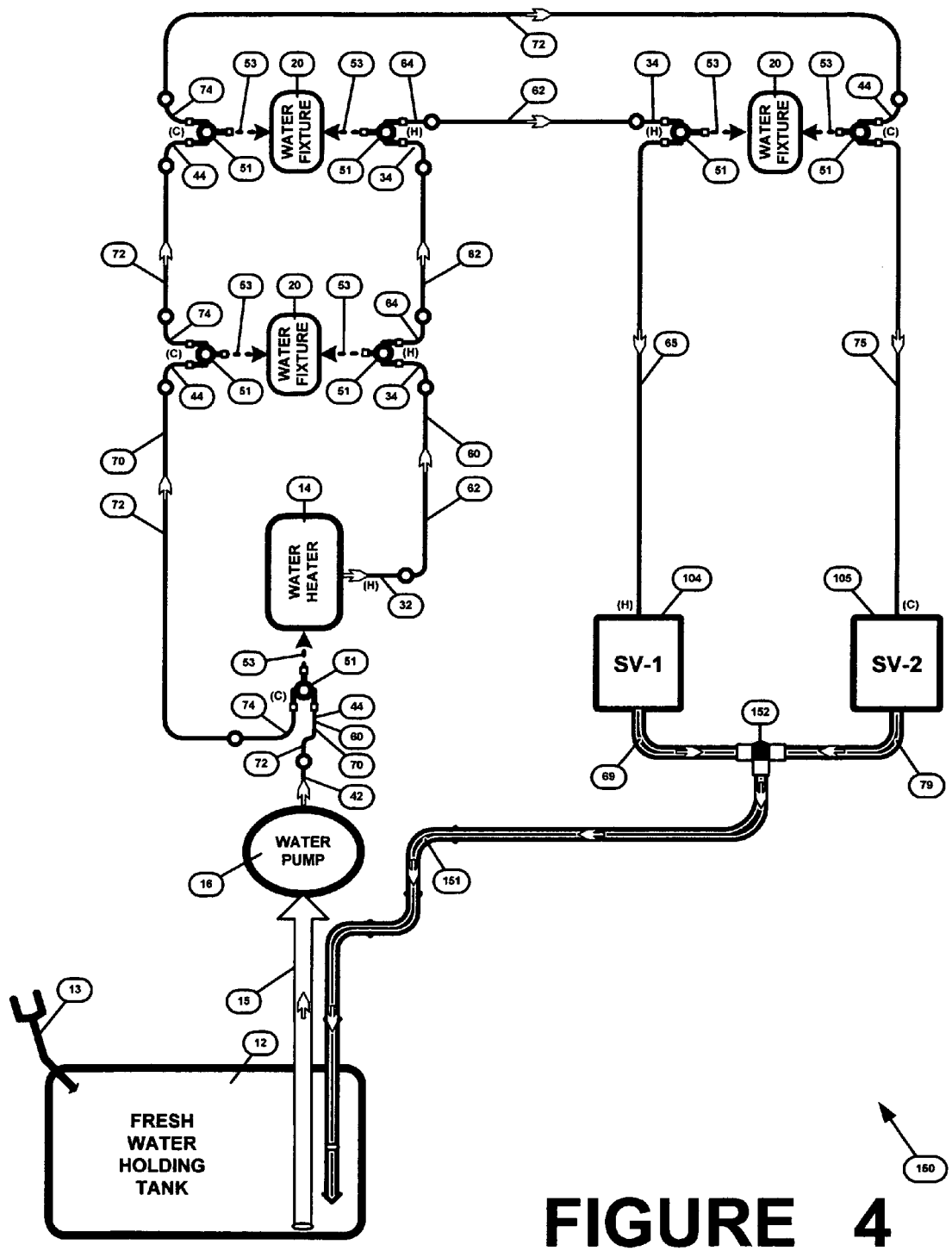
FIG. 4 is a water flow schematic showing the water circulation loops for the present water supply Warming System (150).
Figure 9:
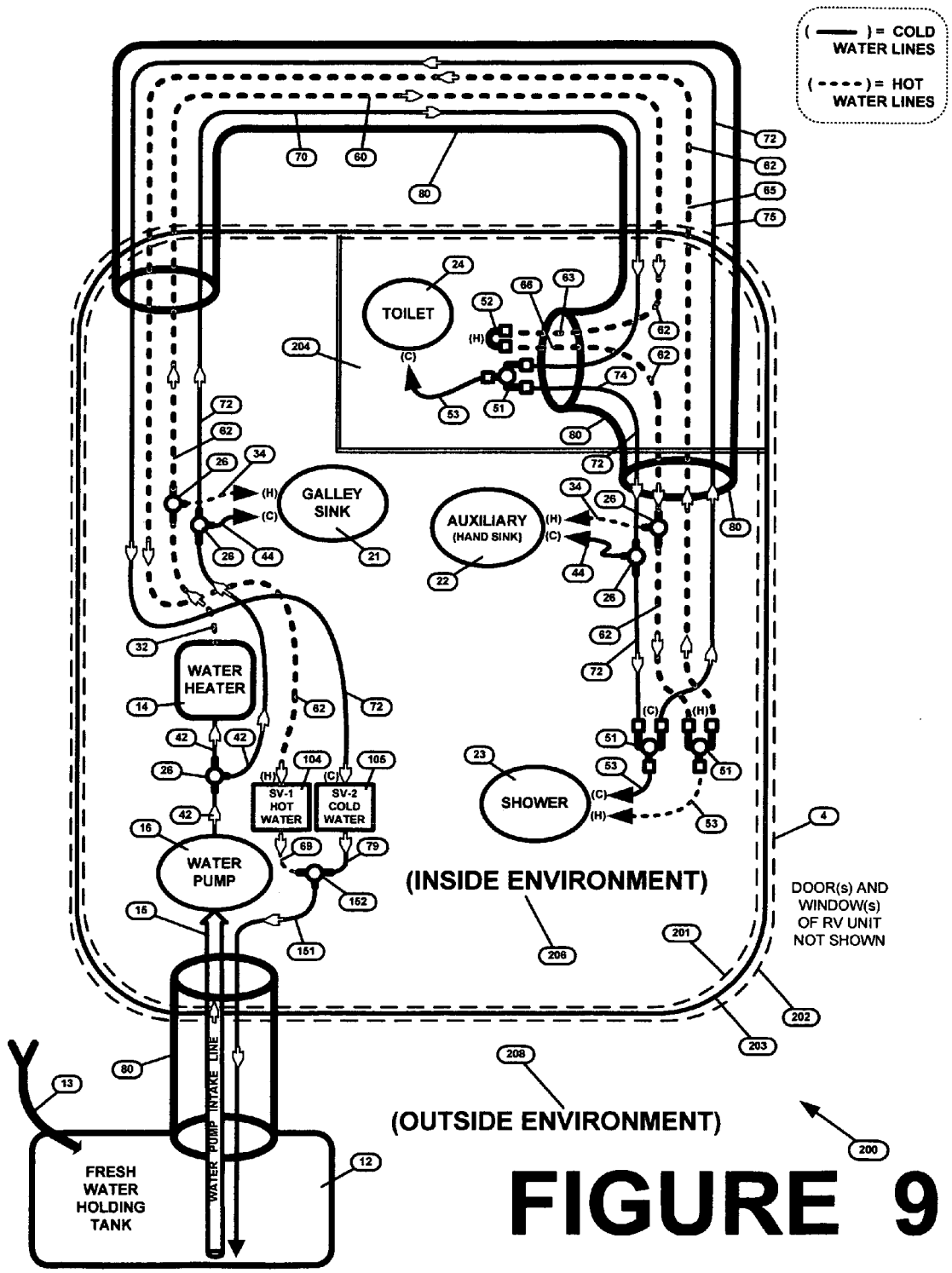
FIG. 9 shows a general layout representation of a plumbing scheme of a recreational vehicle unit equipped Warming System (200).

The present invention relates to an apparatus and method of warming and circulating the water in the fresh water holding tank and the water fixture supply lines of a Recreational Vehicle that is generally indicated by reference numbers 50, 150 or 200 shown in FIGS. 1, 4 and 9, respectively. Each embodiment of the water warming and circulating apparatus and system 50, 150 or 200 includes a holding tank 12, a water heater 14, a pump 16, a water fixture 20, a heated water loop 60 and a cold water loop 70. The location of the hot water heater 14 can differ relative to the pump 16, water fixtures 20. In the embodiment of the warming system 50 shown in FIG. 1, the hot water heater 14 is located downstream the fixtures 20 at the end of the cold water supply line 62. In the embodiment of the warming system 150 shown in FIG. 4, the hot water heater 14 is located downstream the pump 16, but upstream of the fixtures 20.

The warming system 50, 150 or 200 employs two independent, thermostatically controlled hot and cold water circulating loops 60 and 70. Loop 60 uses hot water supplied by the water heater appliance 14 to heat the water in the fresh water holding tank 12. Loop 70 uses the warmer heated water in the fresh water holding tank 12 to warm the bundled hot water modified header/supply lines 62 and the cold water modified header/supply lines 72 without excessive or unnecessary heating the holding tank water.

The primary function of the hot water loop 60 is to warm the fresh water holding tank 12. As the hot water loop 60 is bundled with the cold water loop 70, both the cold water modified header/supply lines 72 and the hot water modified header/supply lines 62 are heated when the holding tank 12 water is heated by the hot water loop.

The hot water loop circulating line 60 is basically a closed loop system except for any water fixture(s) connected to the loop. Heated loop 60 has at least one manual valve fixture 20 to selectively dispense hot water drawn from the heated loop. The hot water loop 60 water flow is controlled by a normally closed solenoid valve (SV-1) or heated loop flow control valve 104. For solenoid valve 104 to open and allow water to flow through loop 60, the warming system control circuit 110 must be powered "ON". Then the normally open temperature sensor or thermostat (TH-1) 101, with a sensing element in direct thermal communication with the supply water in the holding tank 12, must close when the water in the holding tank reaches the thermostat low temperature set point that then powers the solenoid valve 104 open. When the solenoid valve is powered open, water flow through the hot water loop circulating line 60 will begin. As the water begins to flow through loop 60, the water pressure in the cold water header/supply line will drop, causing the water pump 16 to start up, which maintains water flow through the loop.

The cold water loop circulating line 70 is basically a closed loop system except for any water fixture(s) that is connected to the loop. The cold loop 70 has at least one manual valve fixture 20 to selectively dispense cold water drawn from the cold loop. The cold water loop 70 water flow is controlled by a normally closed solenoid valve (SV-2) or cold loop flow control valve 105. For solenoid valve 105 to open and allow water to flow through loop 70 the warming system control circuit 110 must be powered "ON". Then the normally open temperature sensor or thermostat (TH-2) 102, with a sensing element in direct thermal communication with the bundled water supply lines 80 at a selected point along the bundled lines, must close when the temperature of the bundled lines reaches the thermostat low temperature set point that then will power the solenoid valve 105 open. With the solenoid valve is powered open water flow through the cold water loop circulating line 70 will begin. As the water begins to flow through loop 70 the water pressure in the cold water header/supply line will drop causing the water pump 16 to start up that will then maintain water flow through the loop.

Using only the hot water loop 60 to warm the cold water supply line 62 and heated water supply line 72 would cause excessive heating of the water in the fresh water holding tank 12. This excessive heating would occur when the water supply line thermostat (TH-2) 102 calls for warming more often than would the holding tank 12 thermostat (TH-1) 101. This would also cause excessive cycling of the water heater appliance 14 and water pump 16. A single hot water loop system would require constant fine tuning of the thermodynamic properties between the water plumbing system and the continuously changing thermodynamic property of the fresh water holding tank combined with the ever changing environmental conditions makes this approach impractical.

The on-board water heater or appliance 14 is an integral component of the warming system 50, 15 or 200. The water heater 14 has a cold water inlet and a heated water outlet. The water heater 14 has its own integrated temperature control thermostat that regulates the maximum water temperature in its hot water storage tank similar to that of a residential water heater.

Circulating hot water loop 60 and cold water loop 70 are independently controlled by thermostats 101 (TH-1) and 102 (TH-2), solenoid valve 104 (SV-1) and 105 (SV-2) respectively. Both warming loop solenoids can operate simultaneously, therefore the electrical load and wire gauge must be taken into account although current draw per solenoid is about 0.2 amps for low current coils.

Figure 7:
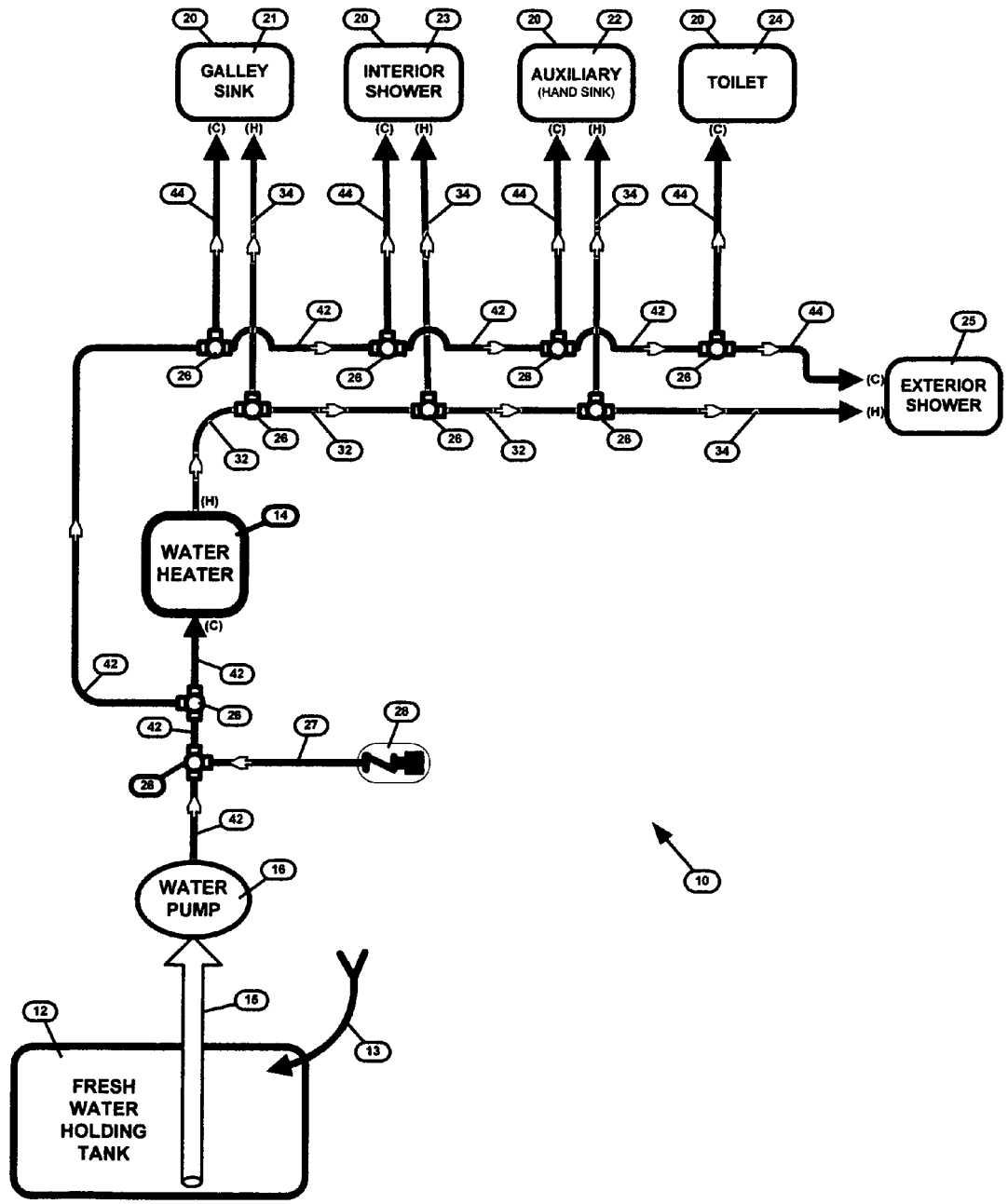
FIG. 7 is a general representation plumbing and equipment schematic showing the flow paths for a conventional RV water system.

The warming system 50, 150 or 200 can be integrated with the existing RV water supply system 10 shown in FIG. 7 as the existing water supply line routing should require little if any change. The existing header/supply lines 32 (hot) and 42 (cold) and branch supply lines 34 (hot) and 44 (cold) would become part of the warming circulating loops 60 (hot) and 70 (cold), respectively, as shown in FIG. 1. The cold water in the chamber formed by the fresh water holding tank 12 is warmed by a hot water line circulating loop 60 that empties the hot water through a tubing line 69 into the holding tank 12 that then warms the water in the tank water by thermal diffusion.

A basic bundled water line overview configuration shown in FIG. 8 is an example of supply and return water lines that would run to a water fixture 21–24 when required. The heated supply line 62 supplies heated water to the fixtures 21–24 in series, and the cold supply line 72 supplies cold water to the fixtures 21–24 in series as shown in FIGS. 1, 4 and 9. Shown also is an expanded view of the looping "U-tee" connector 51, with a short length of water fixture tubing 53 called a water line riser, for connecting the "U-tee" connector to the water fixture 20 and the "U-bend" connector 52, for the toilet hot water warming line if required.

Where the water header/supply line bundle run comes close to a water fixture, a standard "tee" connector 26, may be used if the connections are within the warmed interior 206 that would eliminate the return supply lines having to be run close to the water fixture(s) 20, as shown in 200 FIG. 9. Because there are "many water system plumbing configurations" there can be many bundling types of configurations, but the basic warming loop principle would apply for protecting the supply lines from freezing where they are subject to freezing temperatures.

When the warming is powered "ON" the flow of hot water through the hot water loop 60 is controlled by a 12 volt DC solenoid valve 104 (SV-1) that is controlled by a thermostat 101 (TH-1). Thermostat 101 is in direct communication with the water in the fresh water holding tank 12. This thermostat 101 closes, completing an electrical circuit that opens solenoid valve 104, when the holding tank water temperature drops below a set point of approximately 45° F. When thermostat 101 open circuit temperature of approximately 50° F. is reached it breaks the electrical circuit, closing the solenoid valve and stopping the water flow in loop 60. Again, the thermostat 101 closes when the temperature drops below a set point of approximately 45° F. with an open circuit minimum temperature differential of +5° F. or higher.

Thermostat 101 can be a sealed watertight type that can be located directly into the water of the holding tank. Thermostat 101 can also be a watertight external surface flange mounted probe type or a watertight external thread mounted probe type or just a surface contact affixed to the outside of tank 12 and then insulated from exposure to outside air temperatures if applicable.

As this solenoid valve 104 controls the hot water flow from the water heater 14, it is referred to as the hot water solenoid valve or SV-1. The watertight thermostat 101 may be replaced with a surface contact thermostat affixed to the outside of tank 12 and then insulated from exposure to outside air temperatures if applicable.

The warming of the modified water system header/supply lines 32 and 42 is primarily accomplished using the cold water line circulating loop 70 that also empties into the fresh water holding tank 12. The holding tank water temperature would be a minimum of five degrees warmer then the water line thermostat 102 (TH-2) low temperature activation set point which will provide warming of the of the modified water system header/supply lines 32 and 42. Control of the water through the loop 70 is also by a thermostat 102 (TH-2) and solenoid valve 105. This thermostat 102 is located at a point where the bundled and insulated water system circulating lines 60 and 70 are most exposed to cold temperature and wind chill. Any additional thermostat(s) 103 (TH-3) that may be required to monitor other areas of the water system lines or plumbing components must be wired in parallel with thermostat 102. Again, the thermostat closes when the temperature drops below a set point of approximately 40° F. with an open circuit minimum temperature differential of +5° F. or higher.

When the warming is powered "ON" the flow of cold water through the cold water loop 70 is controlled by a 12 volt DC solenoid valve 105 (SV-2) that is controlled by a thermostat 102 (TH-2). Thermostat 102 is in direct communication with the bundled water supply lines at a selected point along the bundled lines to monitor the bundle water line temperature 80 FIG. 8A. This thermostat 102 closes, completing an electrical circuit that opens solenoid valve 105, when the bundled water line temperature drops below a set point of approximately 40° F. When thermostat 101 open circuit temperature of approximately 45° F. is reached it breaks the electrical circuit, closing the solenoid valve and stopping the water flow in loop 70. Again, the thermostat 102 closes when the temperature drops below a set point of approximately 40° F. with an open circuit minimum temperature differential of +5° F. or higher.

Thermostat 102 can be a sealed watertight type that is located directly under the low profile insulation and against the plastic wrap shroud tubing that encloses the bundled water line tubing. Again this thermostat 102 is located at a point where the bundled and insulated water system circulating lines 60 and 70 are most exposed to cold temperature and wind chill.

Any additional thermostat(s) 103 (TH-3) that may be required to monitor other areas of the water system lines or plumbing components that are protected by the warming system and must be wired in parallel with thermostat 102. Again, the thermostat 103 closes when the temperature drops below a set point of approximately 40° F. with an open circuit minimum temperature differential of +5° F. or higher.

Because this solenoid valve 105 controls the flow of cold water from the water holding tank 12, it is referred to as the cold water solenoid valve SV-2. When SV-2 opens, the warmed water will flow through the water pump intake line 15, water pump 16, the modified cold water supply line 42, cold water loop return line 75, solenoid valve 105 and out through the cold water tank return line 79 back into the fresh water holding tank 12.

The warming system 50, 150 or 200 needs very little additional hot and cold water supply tubing except for the hot water return line 65 and/or cold water return line 75 as shown in 50 FIGS. 1 and 200 FIG. 9. The layout of the water fixtures 20, water heater appliance 14, water line runs, water handling equipment (i.e. water pump 16, solenoid valve 104 and 105) and the water line components (i.e. "U-tee" connectors), shown in FIG. 1, was done for convenience and simplification to show the concept of the warming system principle of operation. The order and number of water fixtures as well the plumbing scheme varies between models and manufacturers.

Figure 8B:
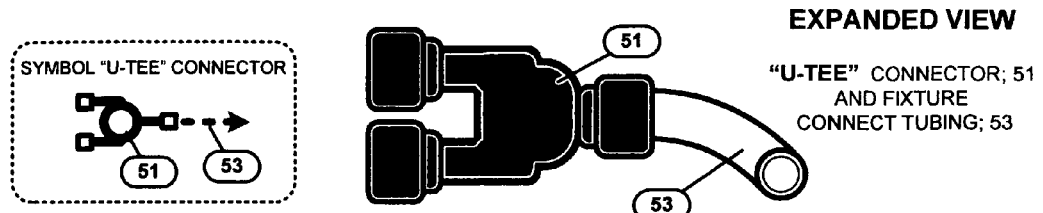
FIG. 8B shows an expanded view of a U-Tee connector and water fixture-connect tubing.
Figure 8A:
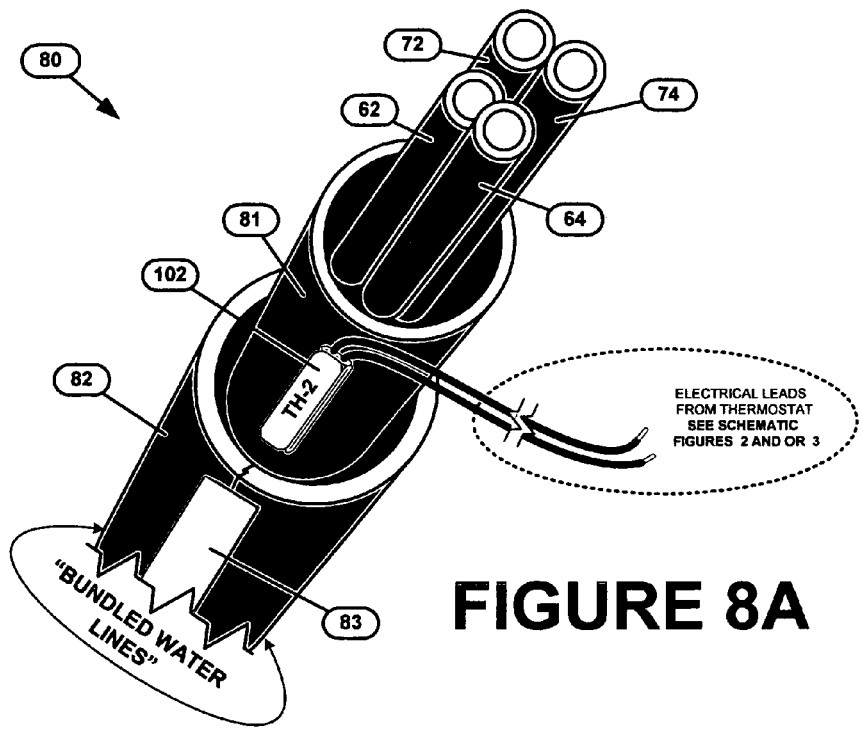
FIG. 8A shows the bundled water lines principle for the present Warming System.

Routing of the water pump intake line 15 from the holding tank 12 and the loop return tank lines 69 and 79 running back into the holding tank 12 can expose these water lines to freezing outside environment 208 but also to wind chill effects as these water lines run outside the heated interior 206 of the unit as shown in FIG. 9. The heated and cold water supply lines 62 and 72, including the undispensed water in the cold water return line 75 and hot water return line 65, can also be exposed to outside temperatures and wind chill effects when run outside of the RV interior 206. Therefore, any water lines exposed to outside temperatures, including any water line runs inside the heated interior 206 that may be subject to freezing temperatures, are protected and warmed by the circulating warming loops. These exposed water line runs must be bundled in a plastic shroud tubing wrap 81, covered or wrapped with an insulating covering 82 that is sealed with metal adhesive insulating tape 83 as illustrated in FIG. 8A.

A typical method used by manufacturers to connect the water fixtures 20 and appliances is to branch off from a main hot and cold water header/supply lines 32 and 42 as shown in FIG. 7. This common branching method generally involves splicing a standard "tee" connector into the supply lines at a convenient location no matter how far away the water fixtures may be from the water supply lines.

Rather than branching off the main hot and cold header/supply lines as illustrated in FIG. 7, the warming system loops the main water header/supply lines near to each water fixture and device, as in FIG. 1, then back out again. This looping of the main water header/supply line is referred to as the modified water header/supply line that requires a slight modification to the typical method as illustrated in 50 FIGS. 1 and 200 FIG. 9. To accommodate the smallest possible radius when looping the modified water header/supply lines that run close to or next to the water fixtures 20 or other water appliances such as water heater 14 a "U-tee" connector 51, as shown in FIG. 8B, is used instead of a standard "tee" connector.

The modified water header/supply line may not be require to loop near or next to any of the water fixture 20 and/or water heater appliance 14, as shown in 200 FIG. 9, when they do not require protection from freezing temperatures. For these water fixtures and/or appliance a standard "tee" connector can be used instead of the "U-tee" connector to connect them to the modified header/supply lines.

Looping of the hot water modified header/supply line 62, the hot water branch return line 64 with a "U-tee" connector near or close to water fixture 20 may not be required to protect the water lines from freezing then a standard "tee" branch connector 26 may be used.

Figure 8C:
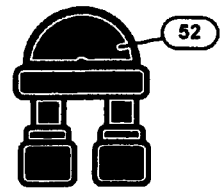
FIG. 8C is an expanded view of a U-Bend connector.

Also the hot water loop lines 63 and 66 running to the toilet water fixture 24 including the "U-bend" connector 52, as shown in FIG. 8C, may not be required to protect the cold water line 62 and 74 from freezing if the toilet cold water loop line would not be subject to freezing.

At the last water fixture or end of the modified hot water supply line loop 60, a hot water loop return line 65 is required to connect the hot water solenoid valve 104. This solenoid valve 104 controls the flow of hot water from the water heater tank back into the fresh water holding tank 12 through the return line 69 for warming the water in the hold tank 12.

The cold water header/supply line 42 from the water pump is modified to complete the loop 70, as required for Warming System freeze protection. Each water fixture 20 may require a cold water modified header/supply line 62 and a cold water return line 74 except for water fixtures where looping may not be required to protect the lines from freezing then a standard "tee" branch connector 26 may be used. At the last water fixture or water appliance at the end of the modified cold water supply line loop 70, a cold water loop return line 75 is required to connect the cold water solenoid valve 105. This solenoid valve 105 controls the flow of cold water back into the fresh water holding tank 12 through the cold water tank return line 79 for warming of the water supply lines.

A standard "U-tee" connector 51 is used for looping of the hot and/or cold water lines at or near water fixtures 20 and appliance such as the water heater 14 where standard "tee" connectors 26 would not allow for practical, clean and easy way for looping of water lines. The expanded view of the looping "U-tee" connector is shown in FIG. 8B, that then requires only a short length of tubing 53 called the water riser line to connect the water fixtures or appliances to the loop "U-tee" connector.

A benefit of using a second cold water circulating line 70 to warm the modified water system supply lines 32 and 42 is that it not only prevents over heating the water in the holding tank 12 but also reduces water heater 14 and water pump 16 cycling, thus saving energy.

Because space is limited, efficient use of space is critical. There may not be much room for the bundled, wrapped and insulated water supply lines 62 and 72 with the additional water fixture return lines 64 and 74 that form the warning loops 60 and 70 of the Warming System 50. A product called "Astro Foil™" developed by NASA is a low profile insulation that is only ¼" thick, but offers R-15 factor (equal to 5 inches of fiberglass insulation) that could allow for the bundled and insulated tubing without rerouting of the water lines because of space limitations.

When the unit is equipped with a gas/electric hot water heater 14 and using a small electrical space heater (not shown) to warm the interior 206 the warming system 50 does not require use of any on-board battery power or LP gas in moderately freezing temperatures when plugged-in to an external power source. The recreational vehicle owner can have an outside electrical outlet installed on the garage, house or a post near where the RV unit is parked between use so that it can be plugged-in.

Thermal Principles

Warming of the water supply plumbing lines is by circulation of hot and warm water through water system loops 60 and 70. The modified hot water header/supply line 62 and modified cold water header/supply line 72 and the water header/supply return line 64 and 74 are bundled in parallel and routed together as to be warmed by thermal convection principle as illustrated in FIGS. 1, 8 and 9. Warming of the fresh water in the holding tank 12 is by discharging hot water from the water heater tank through hot water circulating line 60 back into the water tank 12 through the hot water tank return 69, so that the tank is warmed by thermal diffusion. Thermal diffusion occurs whenever fluids of non-uniform temperature are combined and naturally mix to approach thermal equilibrium. This hot water circulating line 60 is used primarily for warming the holding tank water but also provides convection warming of the both the hot and cold bundled water supply lines by uniquely integrating the hot water supply line in the circulating loop design. The warming system 50 application of thermal convection, thermal diffusion and closed water circulating system being applied to the water supply system of recreational units is unique, practical, efficient and cost effective for providing cold weather freeze protection.

Electromechanical Devices and Interconnect Wiring

The warming system electrical control schemes can range from the simplest, most basic and cost effective to an automated digital logic control scheme that can employ multiple point sensors and digital displays that would be costly with little, if any, benefit to the systems' efficiency of effectiveness. The two electrical control schematics shown in 110 FIG. 2 "Basic Control" and in 130 FIG. 3 "Master Control" are cost effective, and requires only a simple single switch for the customer to use and understand when operating the warming system. Both control systems shown have solenoid valve indicator lights so that the customer also knows when the warming loops are operating.

The control/display switch circuits 110 or 130 required only three wires to connect the electromechanical devices and one wire for circuit 110 or two wires for circuit 130 to interconnect to the existing on-board pump power switch 17. These wires are as follows:

A) Single conductor wire 106 to connect indicator light (LED-1) 114 to solenoid side of thermostat (TH-1) 101 to indicate when the hot water solenoid valve (SV-1) 104 is energized, indicating the holding tank water is warming.

B) Single conductor wire 107 to connect indicator light (LED-2) 115 to solenoid side of thermostat (TH-2) 102 to signal when the cold water solenoid valve (SV-2) 105 is energized, indicating the water supply lines are warming.

C) Single conductor wire 108 to connect (SW-1) 111 in the "Basic Control" control circuit 110 or (SW-1, terminal b-2) 131 in the "Master Control" control circuit 130 to supply 12 volt DC to thermostat (TH-1) 101 and (TH-2) 102 as to provide energizing voltage to the thermostats perspective solenoid valve (SV-1) 104 and (SV-2) 105 when a thermostat closes, calling for warming. Optional thermostat (TH-3) 103 is shown for wiring reference if an additional thermostat is required to monitor an additional water line location or other plumbing devices or plumbing components protected by the warming system. In both schematic circuits 110 and 130 thermostat (TH-3) 103 is labeled as (TH-3, etc.) which indicated that more thermostats (i.e. TH-4, TH-5, etc.) can be added but all additional thermostats must be wired in parallel with thermostat (TH-2).

D) Single conductor wire 109 to connect armature side of (SW-1) 111 in the "Basic Control" circuit 110 to the water pump 16 side of the water pump power switch 17 so when the pump is powered "ON" the "Warming System" thermostats are also receiving power and can activate the solenoid valves when warming is needed.

E) Single conductor wire 132 to connect both contact terminals ("a-1" and "a-2") of armature "a" of switch (SW-1) 131 in the "Master Control" circuit 130 to the power supply side of the water pump power switch 17 and single conductor wire 109 to connect the water pump 16 side of the water pump power switch 17 to both armature terminals ("a" and "b") of switch 131 so the "Master Control" switch will supply power to the water pump 16 when (SW-1) is switched from the center "OFF" position to either Warming System "ON" or to the Bypass "ON". The "Master Control" circuit 130 allows the Water pump power switch 17 to power the water pump 16 independently without activating the "Warming System" while automatically powering the water pump when (SW-1) is switched from the center "OFF" position to either Warming System "ON" or to the Bypass "ON" position.

When selecting solenoid valves the coil current must not exceed the thermostat current rating. Thermostats are available in a wide range of current capacities, but the higher the current rating the greater the cost. On the other hand low current solenoid valves are very reasonable and more than offset the cost of high current thermostats. Direct current solenoid valves equipped with inductive kickback diodes to protect electronic components is required and is standard on most low voltage dc coils.

Control Circuit Overview

Figure 2:
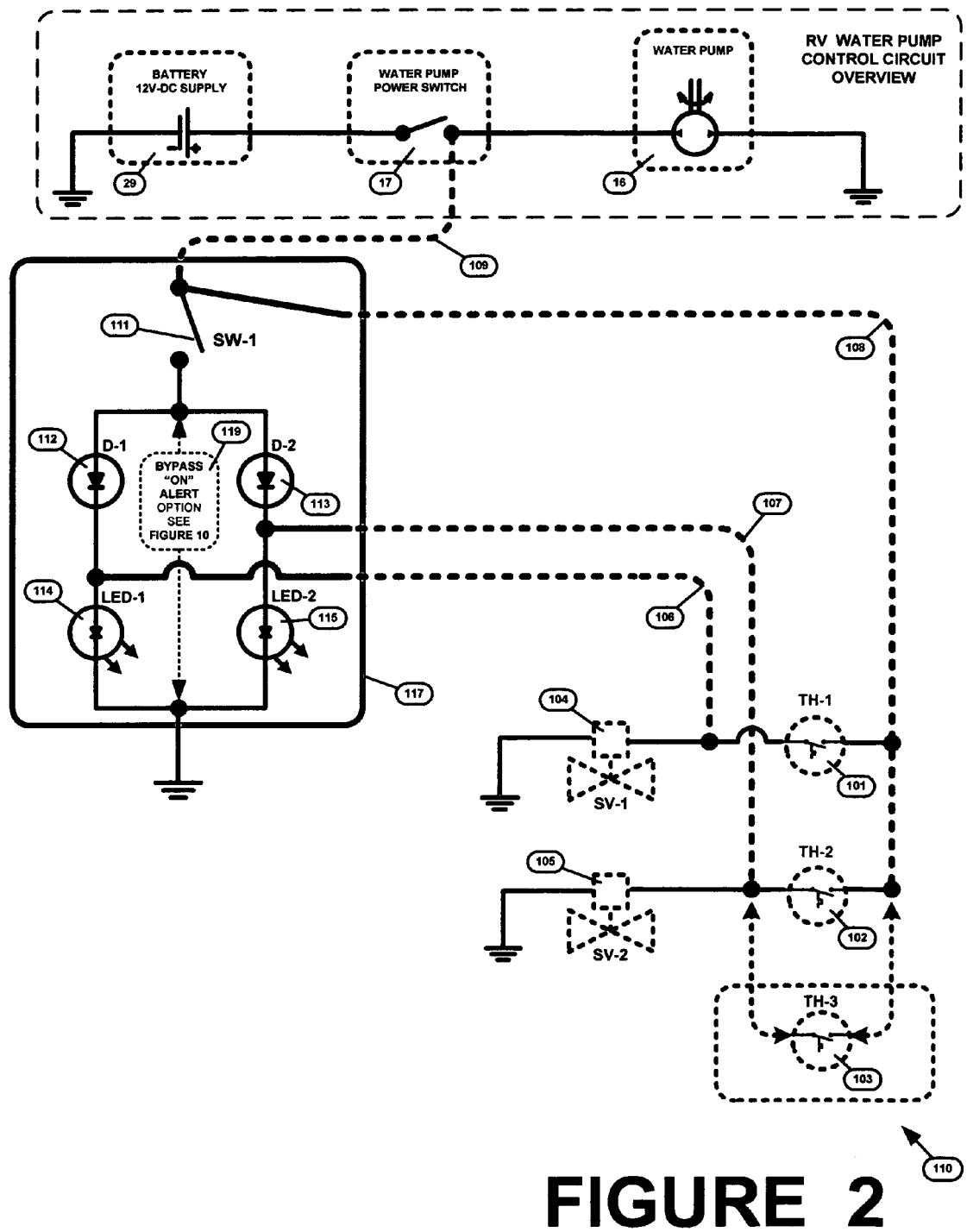
FIG. 2 is an electrical schematic of a basic control circuit for the present water supply Warming System.
Figure 3:
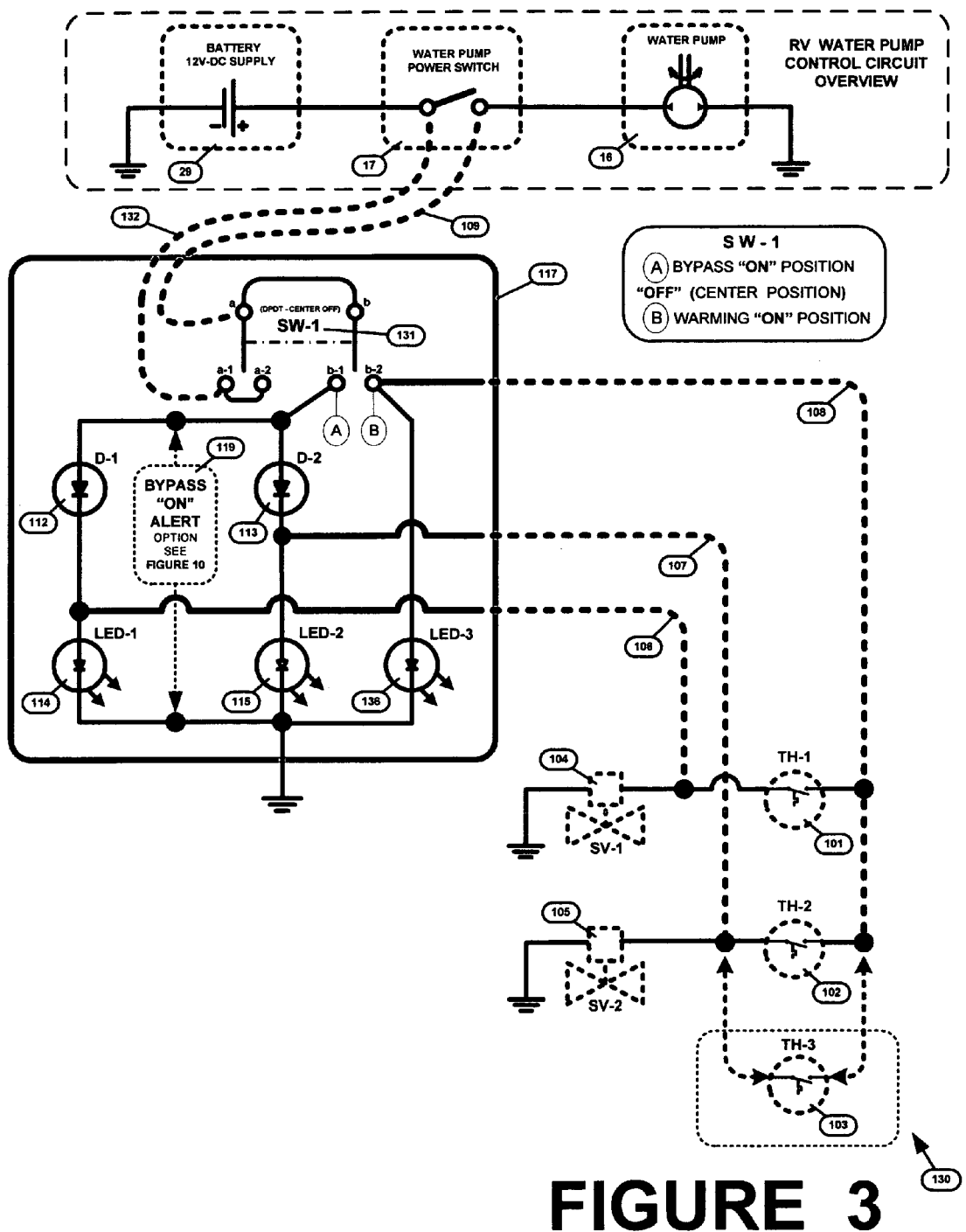
FIG. 3 is an electrical schematic of an alternate master control circuit for the present water supply Warming System.

The "Basic Control" circuit schematic 110, shown in FIG. 2 and the "Master Control" circuit schematic 130, shown in FIG. 3 and the Control/Display mounting plate 160 shown in FIG. 5 can take a variety of forms that are simple and straightforward for the user, yet requires minimal electrical components and wiring for the manufacturer. The color of the indicator lights may be different then what are designated as discussed below, in the "Control/Display Plate Layout" shown in FIG. 5A can vary greatly and is only an example layout.

Basic Control Circuit

The "Basic Control" circuit schematic 110 (FIG. 2), is interconnected to the on-board water pump power switch 17 as to automatically activate the "Warming System" 50, 150 and 200 whenever the pump power is switch "ON" as the pump needs to be powered for the warming system to operate. Only one additional (single pole, single throw) switch 111, referred to as the "BYPASS" switch, is required to manually bypass the temperature monitoring thermostat switches and power open the solenoid valves 104 and 105 required for winterizing or flushing of the water system. The "Basic Control" wiring configuration 110 includes: one standard (single pole, single throw switch) "Bypass" switch 111, two indicator lights: (LED-1) 114 (tank warming) and (LED-2) 115 (lines warming) and two current blocking diodes (D-1) 112 and (D-2) 113 mounted on a display plate 117 as shown in FIG. 5A. The "Bypass" switch (SW-1) 111 is used only to bypass the thermostats (TH-1) 101 and (TH-2) 102 that then open solenoid valves (SV-1) 104 and 105 (SV-2) when the pump switch 17 is turned "ON" so that the circulating loop lines 60 and 70 can be winterized. The two indicator lights 114 and 115 are wired one each to solenoid valves 104 and 105 respectively, to display when a solenoid valve is powered open or when the circulating lines and/or holding tank are being warmed by the system. Switch 111 could simply be labeled "BYPASS". An optional (buzzer and/or LED) 119 can provided an alert in the event that the "BYPASS" switch may have been inadvertently switched "ON" when the pump power switch is turned "ON". This option should be standard because if the "BYPASS" switch is inadvertently switched "ON" the warming system thermostats are shunted, powering the solenoid valves open, causing the water pump 16 and water heater 14 to excessively run resulting in excessive and unnecessary over heating of the water in holding tank 12 to occur. The "BYPASS" switch should only be turned "ON" when winterizing or flushing of the on-board water system.

Master Control Circuit

The "Master Control" circuit schematic 130 (FIG. 3), is also interconnected to the on-board water pump power switch 17 but does not automatically activate the warming system when the pump power is switched "ON". Being that the "Master Control" switch (SW-1) 131 is a double pole, double throw, with a center "OFF" position and is interconnected in parallel with the pump switch 17 to automatically power the pump "ON" whenever the switch is in either the "Warming ON" or the "Bypass ON" position. The "Master Control" component wiring configuration 130 includes: one standard (double pole, double throw, center "OFF") switch 131, three indicator lights (LED-1) 114 (tank warming), (LED-2) 115 (lines warming) and (LED-3) 136 (warming system "ON") and two current blocking diodes (D-1) 112 and (D-2) 113 mounted on a display/control plate 117. The Master Control circuit 130 allows the water pump switch 17 to function normally and will only operate the water pump 16 as normal without activating the warming system 50. Switch 131 referred to as the Warming System Control Switch. When Master Control switch 131 is in the Warming ON position the warming system controls the circulating loops solenoid valves as described above in the Basic Control except that the pump power switch does not need to be turned "ON". When Master Control switch 131 is in the Bypass ON position the warming system controls the circulating loops solenoid valves as described above in the Basic Control with the Bypass ON except that the pump power switch does not need to be turned "ON". The Master Control circuit allows the user to bypass the warming system when temperatures may get cold enough to close a warming loop thermostat but not too cold as to freeze the water. This will allow the user to power the water pump and use the water supply system in lower temperatures that would otherwise activate the warming system and warm the water lines and/or fresh water holding tank.

Master Control circuit 130 shown in FIG. 3 may be equipped with an optional (buzzer and/or LED) 119 to provide an alert when switch 131 is in the Bypass ON position to signal in the event that the bypass is inadvertently switched "ON". This option should be standard because if the bypass is inadvertently switched "ON" the warming system thermostats are shunted, powering the solenoid valves open, causing the water pump and water heater to excessively run resulting in excessive and unnecessary over heating of the water in holding tank 12 to occur. The "Bypass" should only be "ON" only when winterizing or flushing of the on-board water system.

Figure 10:
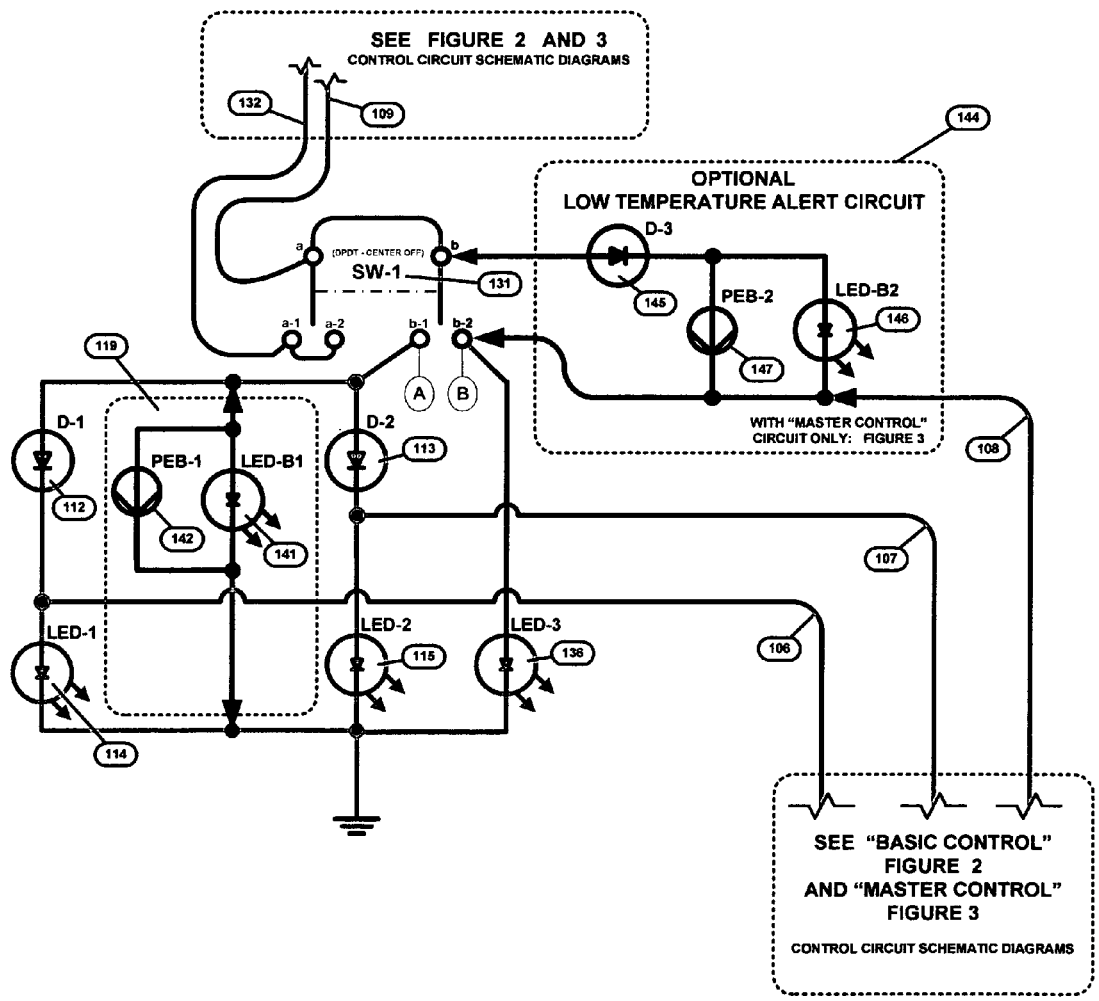
FIG. 10 is an electrical schematic showing inter-connecting electrical components for the Bypass Alert and the Low Temperature alert control circuit options.
Figure 11A:
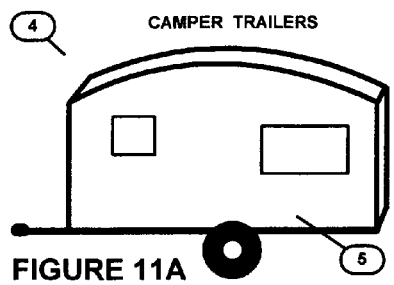
FIG. 11A shows a camper trailer unit.
Figure 11B:
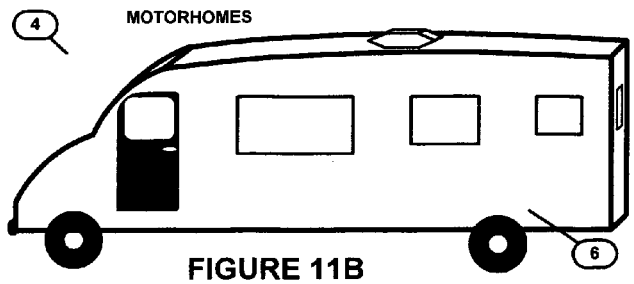
FIG. 11B shows a motor home unit.
Figure 11C:
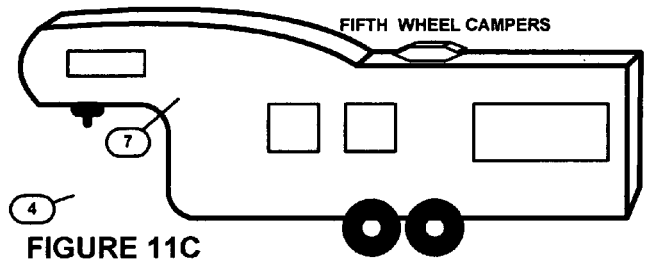
FIG. 11C shows a fifth wheel camper unit.
Figure 11D:
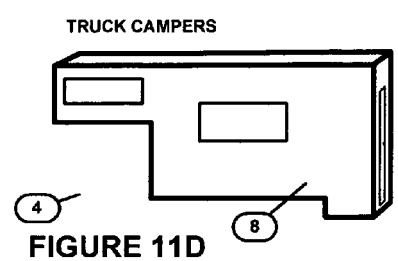
FIG. 11D shows a truck camper unit.
Figure 12A:
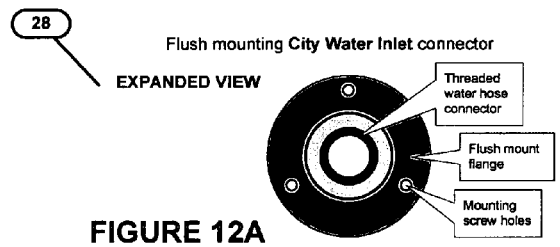
FIG. 12A is an expanded view a flush mounting city water inlet connector 28.
Figure 12B:
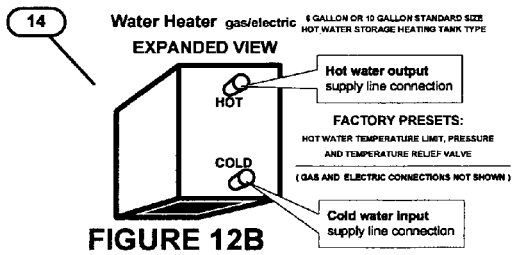
FIG. 12B is an expanded view of a water heater 14.
Figure 12C:
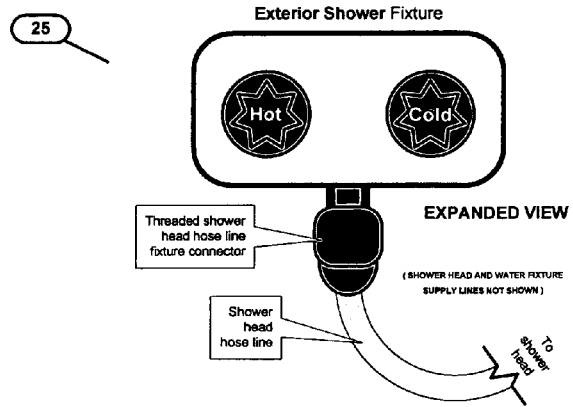
FIG. 12C is an expanded view of an exterior shower fixture 25.
Figure 12D:
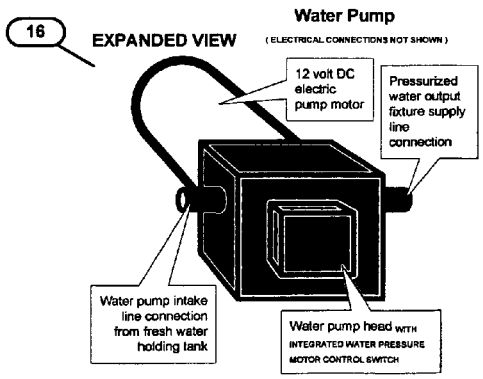
FIG. 12D is an expanded view of a water pump 16.

A Low Temperature Alert option interconnect schematic diagram 140, FIG. 10, could be added that would signal whenever the pump switch 17 is turned "ON" and the warming system switch 131 is in the "OFF" position and a warming system thermostat is closed calling for warming. When the low temperature alert signals, it does not mean that the warming system 50 must be activated but only that the outside temperature is cold enough to activate a warming system thermostat sensor and not necessarily to alert of an imminent water system freezing condition. As a precaution only, the warming system could be turned "ON" when the Low Temperature Alert activates or check the outside temperature and/or weather forecast for potential freezing conditions before deciding not to activate the warming system.

The master control/display switch plate layout 160, shown in FIG. 5A has indicator lights 114, 115, 136, 141 and 146. The colors of the lights could be "yellow" for (LED-1) 114 to indicate the tank is warming, "yellow" for (LED-2) 115 (to indicate the water lines are warming), "green" for (LED-3) 136 to indicate the warming system 50 is ON, "blinking red LED" for (LED-B 1) 141 (to indicate the Bypass is "ON") and "blinking red LED" for (LED-B2) 146 (to indicate the Low Temperature), schematic diagram 140 shown in FIG. 10.

A person of skill in the art should readily understand that the present warming system 50 can be used with many other control wiring configurations than those shown in FIGS. 2, and 3. The separate water pump power switch 17 could be eliminated by simply replacing the Master Control switch 131 (SW-1) with a two pole multiple-position rotary switch or a two pole multiple-position slide switch or a two pole multiple-position lever switch which would still allow for independent water pump operation. A customized warming system control display could incorporate digital temperature readouts of the holding tank water, outside and inside temperatures, system status including automatic cell phone communication alert notification. An automatic warming system "ON" select feature could be incorporated that would automatically activate the warming system whenever the outside temperature falls below freezing for more then 4 hours. This would allow for a totally integrated customized system display look. "Bells and whistles" have a real appeal as long as they are not overly done or complicated or expensive. In short, "bells and whistles" sell products.

Water Heater

The on-board water heater appliance 14 is an integral component and must be "ON" for the warming system 50 to provide protection from freezing. For most flexibility and efficiency, the hot water heater 14 should be LP gas and electric type. When connected to an external 120V AC source provided by a park, campground or at the customer's home, the warming system 50 operates without using any on-board fuel. When external 120V AC power is not available the water heater can operate from the on-board LP gas supply. Since a water heater 14 is standard equipment for most unit manufacturers, there would be no additional cost unless the combination gas/electric water heaters are an option.

The hot water from the water heater appliance 14 is the primary warming source for the fresh water holding tank 12, and is the secondary warming source for the water lines or loops 60 and 70. Since the warm holding tank water is the primary source for warming the water lines 60 and 70, tank return lines 69 and 79 and the water pump intake water line 15 this maximizes efficiency by utilizing warmed fresh water in the holding tank without using hot water from the water heater tank. The water heater 14 is the only source of heat for the warming system 50. A 6-gallon hot water heater 14 should provide freeze protection to meet the reasonable low temperature objective even with significant wind chill effect if the RV unit is reasonably insulated and proper Warming System installation procedures are employed. The limiting factor in setting the low temperature limit of the warming system 50, which can vary from manufacturer to manufacturer and model to model, is not to have the water heater 14 or water pump 16 run or cycle excessively. Like a larger electrical battery, the water heater 14 having a 10-gallon water heater tank will store more heat energy than a 6-gallon water heater tank, which could extend lower temperature limits to well below 0° F. and/or result in less water heater and water pump cycling. Driving at speeds of 65 to 75 MPH in temperatures below 10° F. and for extreme low temperatures of below 0° F. could be a factor in choosing a larger capacity water heater.

To deal with high wind chill factors when the unit is moving, motor homes have an advantage because they can use a gas/electric water heater appliance 14 equipped with a engine heat exchanger (not shown). These water heaters use the heat energy from the engine-cooling system to heat the water in the water heater tank 14 that is otherwise wasted when the engine is running. This will provide ultimate efficiency of the warming system 50 when the recreational vehicle is moving.

An additional factor in considering water heater 14 and pump 16 cycling is the amount of water in the fresh water holding tank 12. The more water in the holding tank 12, the more hot water will be needed the warm the holding tank water. So with more water in the tank 12, the pump will run longer during the heating cycle but less often as it will take more time for the water to warm up and cool down. The less water in the holding tank the less hot water will be needed to warm the holding tank water. So with less water in the holding tank 12 the pump 16 will run less during the heating cycle but more often as it will take less time for the water in the tank to warm up and cool down. So when the fresh water holding tank 12 thermostat 101 calls for warming, the water pump running and the water heater 14 cycling is directly related to the amount of water in the fresh water holding tank 12. Plastic water holding tanks 12 are generally used because they are lighter and better than metal tanks for many reasons which for one includes an advantage for the warming system 50, which is a reduced rate of heat loss. Reasonable shielding of the fresh water tank 12 from wind chill effects and/or providing some insulation will increase efficiency of the warming system 50 and reduce pump 16 and water heater 14 cycling.

Water Pump

The on-board water pump 16 is an integral component and must be "ON" for the warming system 50 to provide protection of the water system from freezing temperatures. The conventional pump 16 has inlet and discharge openings. All standard 12-volt RV water pumps are self-contained devices that have an integral preset shut-off water pressure limit switch which interrupts power to the pump motor when the preset pressure limit is reached. This pump provides water pressure for the on-board water fixtures 20 and the warming system 50 circulating loop lines 60 and 70. Only when a water fixture valve is opened, or when the warming system 50 is turned "ON" and one or both solenoid valves 104 (SV-1) and 105 (SV-2) are energized (powered open), will the water supply line pressure drop. This drop in water pressure is detected by the water pump's pressure switch that will automatically activate the pump motor which will run until the pumps' high pressure shut-off limit switch is again reached.

When the basic control system 110, shown in FIG. 2, is employed, the water pump switch 17 must be turned "ON" for the warming system 50 to be activated. When winterizing or flushing the water system, the water pump switch 17 and the warming system bypass switch 111 must both be turned "ON" to open the solenoid valves 104 and 105 and allow anti-freeze or fresh water (when flushing the system) to circulate in the warming system 50 lines. The bypass control switch plate (not shown) requires a minimum of two solenoid valve indicator lights but it is recommended that the optional bypass ON 119 (buzzer and/or LED) be included for user convenience.

When the master control system 130 is employed as shown in FIG. 3, the water pump switch 17 operates independently without activating the warming system 50. However when the master control switch 131 is "ON" in either the warming "ON" or bypass "ON" position, the water pump 16 is automatically activated. The "master control/display" switch plate 117, shown in FIG. 5A, has three indicator lights that will display all operating functions of the warming system 50. As shown in FIG. 5B, a simple indicator light "Function Diagram" 161, indicates the status of the system that can be added to the owners' manual and/or affixed to the inside of a cabinet door for convenient reference.

Because the warming system 50 has a low rate of water flow required when warming the water in the fresh water holding tank 12 or water circulating lines 60 and 70, a standard water pump 16 used in many Recreational Units will cycle "ON" several times each minute. Standard water pumps have high initial starting currents and can be quite noisy both inside and outside the unit when running which can be very annoying when trying to sleep. The benefits of a variable speed water pump would be quite desirable and not just for units equipped with the warming system but for many people. One benefit is low current operation (up to 60% less current) under low water flow rates without high surge current start-up cycling encountered in standard pumps that would extend the on-board battery 29 electrical supply times in cooler temperatures when the warming system would be running more often. The variable speed pumps are much quieter running because there is no high current start-up cycling at low water flow rates as the pump runs at varying RPMs required to maintain steady water pressure which also stops water hammer and eliminates the need for an accumulator tank. Because of the quiet operation and lower power drain on the RV unit's battery 29, the variable speed pump would be a very desirable option for most people who have had experience with Recreational Units equipped with standard water pumps. Noise and power drain on the on-board battery 29, when using a standard low cost, high current water pumps, would be a concern because the pump runs more when the warming system 50 is operating that would result in either shorter protection time and/or a higher low temperature operating limit. Ideally the warming system 50 should be able to operate when the RV unit in an isolated stand alone mode from an on-board, single standard high amp-hour, heavy-duty battery for 8 hours at 10° F. without being plugged into an external 120 volt power source or having to run a electrical generator. Less load on the on-board battery from a standard water pump is an important factor in determining time verse temperature when the RV unit is powered from its' on-board battery only.

Water Line Warming

Water line warming for protection from freezing is basic, straight forward and should require only minimal modification such as a larger opening for the bundled water lines and insulated wrap tubing 80, shown in FIG. 5A to pass through floor or partitions as needed where water supply lines need to be protected from freezing temperatures.

The warming system 50 is based on a radiant principle in which the on-board water supply and circulating lines 60 and 70 are bundled and enclosed in a flexible plastic tubing 81 with low profile insulation 82 then wrapped over the tubing as shown in FIG. 8A. The water line plastic shroud wrap tubing 81 allows for more efficient warming by providing air space around the bundled water line tubing 80 as shown in FIG. 8A. This can be easily accomplished by placing the bundled water tubing in standard flexible plastic shroud wrap such as slit wire guard type wire wrap tubing.

The hot water supply lines 32 and the cold water supply lines 42 running to each water fixture 20 must be connected in series. Where water fixtures 20 are connected to the supply lines that run outside the warmed interior 206, these supply lines must be routed inside next to the water fixture then looped back outside to the next water fixture or device in a series loop configuration 150 shown in FIG. 4. The water pump intake line 15 should be bundled and insulated with the water tank circulating return lines 69 and 79 to where these lines enter the fresh water holding tank. If the pump 16 including fittings and connectors are located outside the RV units' warmed exterior 208 or inside 206 where they may be subject to freezing then they also must be insulated and warmed by the warming system circulating water line 60 and 70 to protect them.

A low temperature thermostat switch (TH-2) 102 should be placed at a point along the bundled tubing run where exposure to freezing temperatures or where the wind chill effect is greatest. Additional thermostats (TH-3, etc.) 103, may be located at other points in the water line run including the area near water pump 16 if warmed by the warming system 50 is required. Any additional thermostat used to monitor other warming system protected plumbing components or areas must be wired in parallel with thermostat (TH-2) 102, so that when any additional thermostat calls for warming the cold water solenoid valve 105 (SV-2) is activated.

Water line thermostat(s) should not be placed directly next to or against any bundled water lines or warming circulating lines 60 and 70 as this would not allow adequate warming of the water lines and would cause excessive cycling. The bundled water line thermostat sensor 102 (TH-2) should be located on the outside of the plastic wrap shroud tubing 81 and then insulated with low-profile 82 so that the thermostat does not come in direct contact with the bundled water lines as shown in FIG. 8A.

The water pump intake line 15 from the fresh water holding tank 12 running to the water pump 16 must be protected from freezing. This is accomplished by simply bundling and insulating the warm water tank return line 79 and the hot water tank return line 69 or the modified tank return line 151 that runs back to the fresh water holding tank 12 with the pump intake line 15 to where they enter the holding tank 12 as shown by the warming system 50 in FIG. 1, city water drain scheme 170 shown in FIG. 6A and plumbing scheme 200 shown in FIG. 9.

Because the warming system 50 employs a dual loop 60 and 70 circulating line design, this allows warm water from the holding tank 12 to warm the bundled water supply lines without using hot water and over warming the holding tank water 12.

The cold water return circulating line 75 that runs from the end of the cold water modified/supply line 72 to the solenoid valve 105 (SV-2) should not be looped to any water fixture 20. Similarly, the hot water return circulating line 65 that runs from the end of the hot water modified/supply line 62 to the solenoid valve 104 (SV-1) should not be looped to water fixture 20. Where water fixture water supply lines run within the warmed protected interior 206, shown in FIG. 9, these sections of water lines do not require bundling and wrapping with insulation 80. Where water fixture water supply lines run close to the water fixtures a standard "tee" connector 26 may be used with a short piece of water tubing connecting the water fixture to the "tee" connector as shown in the plumbing scheme 200 in FIG. 9. The water fixture water supply lines that may be exposed to freezing should be connected in series, bundled, wrap in flexible tubing and insulated.

Rate of Warming Water Circulating Flow

The rate or volume of the warming water circulation flow depends on several factors that include:

A) Bundling and insulation of the water and warming lines 60 and 70.

B) Exposure of the holding tank 12 and bundled water lines 80 to wind chill especially when the unit is moving.

C) The manufacturer's low temperature protection design objective under static and dynamic air conditions such as 0° F. when parked (static) and 10° F. when the RV unit is moving at highway speeds factoring in the wind chill effects (dynamic).

D) Hot water heater 12 tank volume (6 or 10 gallon are currently standard sizes).

E) RV unit insulation efficiency. Given that radiant heating of the on-board water plumbing supply lines 60 and 70 is a very efficient and practical method for low temperature protection, requiring a low volume of warm and/or hot water flow should be all that is required through the warming system circulating water lines. The warming tube 60 and 70 may be copper for maximum heating efficiency when designing for very cold environmental application (i.e. freeze protection below 0° F.) or of polyethylene (PEX) tubing for a more reasonably moderate cold environment that would be acceptable and a long awaited improvement for most customers.

Integrating of the existing water system supply lines 32, 34 and 42, 44 into the warming circulating lines 60 and 70 respectively makes the warming system design effective, efficient and practical.

Controlling the water flow rate of the hot water and the cold/warm water through the warming loop circulating lines 60 and 70 can be easily regulated. By using a smaller diameter fresh water tank return line tubing 69 and 79 that runs from the output side of the hot water solenoid valve 104 (SV-1) and the cold/warm water solenoid valve 105 (SV-2) respectively back into the holding tank 12, will automatically limit the water flow. For example a ¹⁄₁₆, ⅛, ³⁄₁₆ or ¼ inch diameter tube could limit the flow to approximately 0.25, 0.6, 0.9 and 1.2 gpm (gallons per minute), respectively depending on water pressure. Standard small diameter fittings and adapters are available for tubing down to ¹⁄₃₂ of an inch.

If the modified tank return line 151 is used as shown in FIG. 4 and FIG. 9, then the two smaller diameter tubes must be connected with a special "tee" connector 152 that has a larger branch tubing diameter connection as not to restrict water flow when both solenoid valves 104 and 105 are open. Multiple diameter ported "tee" connectors such ¹⁄₁₆ by ⅛ by ¼ inch are available by many manufacturers.

Any surface area of the water holding tank 12 that may be exposed to high wind chill or heat loss, and if insulation is used, will be a main factor in determining rate of the hot water circulation flow including the water heater and pump cycling.

The fresh water holding tank 12 is warmed by hot water from the water heater 14 which must flow through the hot water supply line loop 60 that is in series to each water fixture 20 that also provides warming to all the bundled water supply lines.

Fresh Water Holding Tank

The fresh water holding tank 12 generally has large surface area. Therefore, controlling the rate of hot water flow by using smaller diameter tubing 69 that runs between the hot water solenoid valve (SV-1) 104, and the holding tank 12 will be based on the size of the tank, heat loss and wind chill factor. Another factor includes how much water is in the holding tank 12. If only a few gallons are in the tank 12, the warming system 50 will run for shorter periods of time between cycles but will cycle more often as the water will be warmed quite rapidly and cool rapidly. A near full water tank 12 will cause the warming system 50 to run for longer periods of time between cycles but will cycle less often when warming the water.

For the warming system 50 to operate efficiently, the water level in the holding tank 12 should not be much below ¼ full and never over-filled. If the holding tank 12 is over filled to where the water level is in or at the top of the filling tube, then the water level should be lowered by simply filling any water container, such as a pot, from any water fixture and then dumping the water outside. This may have to be done a few times to lower the water level so that there is no water in the filling tube 13. The water level in the holding tank 12 could also be lowered by opening a water fixture faucet 21 or 22 and allowing the water to run down into the "gray" or "black" water holding tank (not shown) but this would only dilute the RV antifreeze and would unnecessarily fill waste holding tanks.

The modified tank return line 151 allows for a single water return line to enter the tank 12. A special "tee" connector 152 is required to connect the larger diameter modified return line 151 to the smaller diameter solenoid output lines 69 and 79 as shown in FIGS. 4 and 9. The smaller diameter solenoid valve output lines 69 and 79 are required to set and control the water flow rates through each circulating loop 60 and 70. The modified tank return line 151 must be of larger diameter than either of the smaller water flow control tubing 69 and 79 as not to restrict water flow when both solenoid valves 104 and 105 are open.

The hot and cold/warm water circulating tank return lines 69 and 79 or the modified return line 151 could enter the fresh water holding tank 12 at any location including through the fresh water fill line pipe 13. The return lines 69 and 79 or modified return line 151 end(s) should extend down into the lower part of the holding tank 12 so that end(s) are always in the warm tank water. The return line end(s) should not be too near the water pump intake line 15 or fitting as this would as this would affect the thermal diffusion warming in the holding tank 12 and cause excessive cycle running time.

A thermostat 101 (TH-1) must be mounted into or through the fresh water holding tank 12, at the lowest reasonable point so that the sensor remains submerged when the water level is low. If applicable, the tank thermostat 101 may be affixed to the outside of the tank 12 at a point where it can sense the relative water temperature when the water level is low.

When the water temperature drops below the thermostat set point of about 45° F. the thermostat 101 will close. This provides an electrical circuit to power the hot water solenoid valve (SV-1) 104 open when the warming system 50 is powered "ON". When the powered solenoid valve 104 is open, the hot water circulating warming loop 60 discharges hot water into the holding tank 12. If the water tank 12 design allows for the warming system 50 thermostat 101 and the hot 69 and cold 79 water circulating return line(s) or the modified tank return line 151 to enter the tank 12 through the water pump intake line 15 or through the fill line 13, this would eliminate having to penetrate the tank.

Depending on the manufacturers low temperature goals, it may be beneficial to have a thin layer of insulation (not shown) sprayed or applied to the water tank 12 or on areas that would be subject to high wind chills while the unit is moving at highway speeds. If the manufacturer's low temperature goals are very minimal this may require insulating most or the entire fresh water holding tank with "Astro-Foil™" or spray-on insulation could be applied. Insulation may be needed at the lowest area of the holding tank 12 to reduce the warming cycle do to a more rapid heat loss when the water level in the tank is very low. Sprayed insulation or the "Astro-Foil™" can be applied over the tank 12 support straps if there is no clearance for insulation to be placed between the tank and the tank support straps.

Many unit manufacturers use custom configured water-holding tanks 12 with unusual shapes in order to obtain maximum water capacity. Most of-the-shelf tank heaters for warming the water holding tank 12 are not practical or applicable for tanks of an unusual shape and for their low efficiency and power requirements except for square box shaped tanks like those used in many class "A" motor homes and some camper trailer units.

Whatever the manufacturer's low temperature objective for warming system 50 might be, the basic low temperature must ultimately provide reasonable low temperature freeze protection that benefit and appeal to many people. Most people feel that protection down to 10 or 20° F. would really be a significant improvement.

Plumbing Interconnection and Routing

The manufacturer's current water supply line routing should accommodate the plumbing modifications required when implementing the warming system 50. The only modification should be enlarging the openings where the insulated bundled water lines 80 enter or exit the interior 206 of the unit or are run through interior partitions where freeze protection is needed.

The circulating warming loop control solenoid valves (SV-1 & SV-2) may be placed in one location near each other or independently at any appropriate location where hot water loop return supply line 65 and the cold/warm water loop return line 75 would connect to the input side of the solenoid valves. If the water pump 16 is located inside the interior of the unit 206 where it is not subject to freezing temperatures and space allows for the solenoid valves, which are relatively small size, then the valves should be placed next to the water pump 16. If the inside location is subject to possible freezing, then a small coil of hot and cold water circulating lines 60 and 70 may be placed next to or around these items with some insulation added for additional protection and a thermostat sensor (TH-3) 103 may be added. If the water pump 16 is located outside 208, the warm interior 206 where it is subject to freezing temperatures then a small coil of hot and cold water circulating lines 60 and 70 may be placed around the pump and insulated. If available space allows for the solenoid valves to be placed next to the outside water pump location, then both the pump and solenoid valves can be protected by a small coil of hot and cold water circulating lines 60 and 70 and insulated in one area or compartment. A thermostat sensor (TH-3) 103 may be added.

Both the hot and cold water lines 60 and 70 must run in series to each water fixture 20. When the water lines need to run outside 208 of the warm interior 206 to connect a water fixture or device, the water lines 60 and 70 must be looped at that water fixture 20 or device and then run to the next water fixture as shown in FIG. 9.

The water fixture water supply lines 62 and 72 and the water return supply lines 64 and 74 that run near or past a water fixture 20 within the warmed interior 206 and would not be exposed to freezing temperatures do not need to be looped up close or next to the water fixture. Then a standard "tee" connector 26, can be spliced, one each, into the hot and the cold water supply line side of the warming loops 60 and 70 then connecting the water fixture(s) to the "tee" connectors with standard water line tubing as shown for water fixture 21 and 22 as shown in the plumbing scheme 200 of FIG. 9.

Many RV units are equipped with a city water inlet connector 28 for connecting the unit to an external water supply source as shown in 10 FIG. 7. Many RV units have an exterior shower water fixture 25 also shown in 10 FIG. 7. All though the warming system could provide freeze protection of the city water inlet connector 28, the city water on-board supply line 27 and the exterior shower water fixture 25 the additional manufacturer cost of labor and material would be impractical. Therefore isolating and draining water from the city water inlet connector 28, the city water on-board supply line 27 and the exterior shower water fixture 25 would be more practical and cost effective.

Figure 6A:
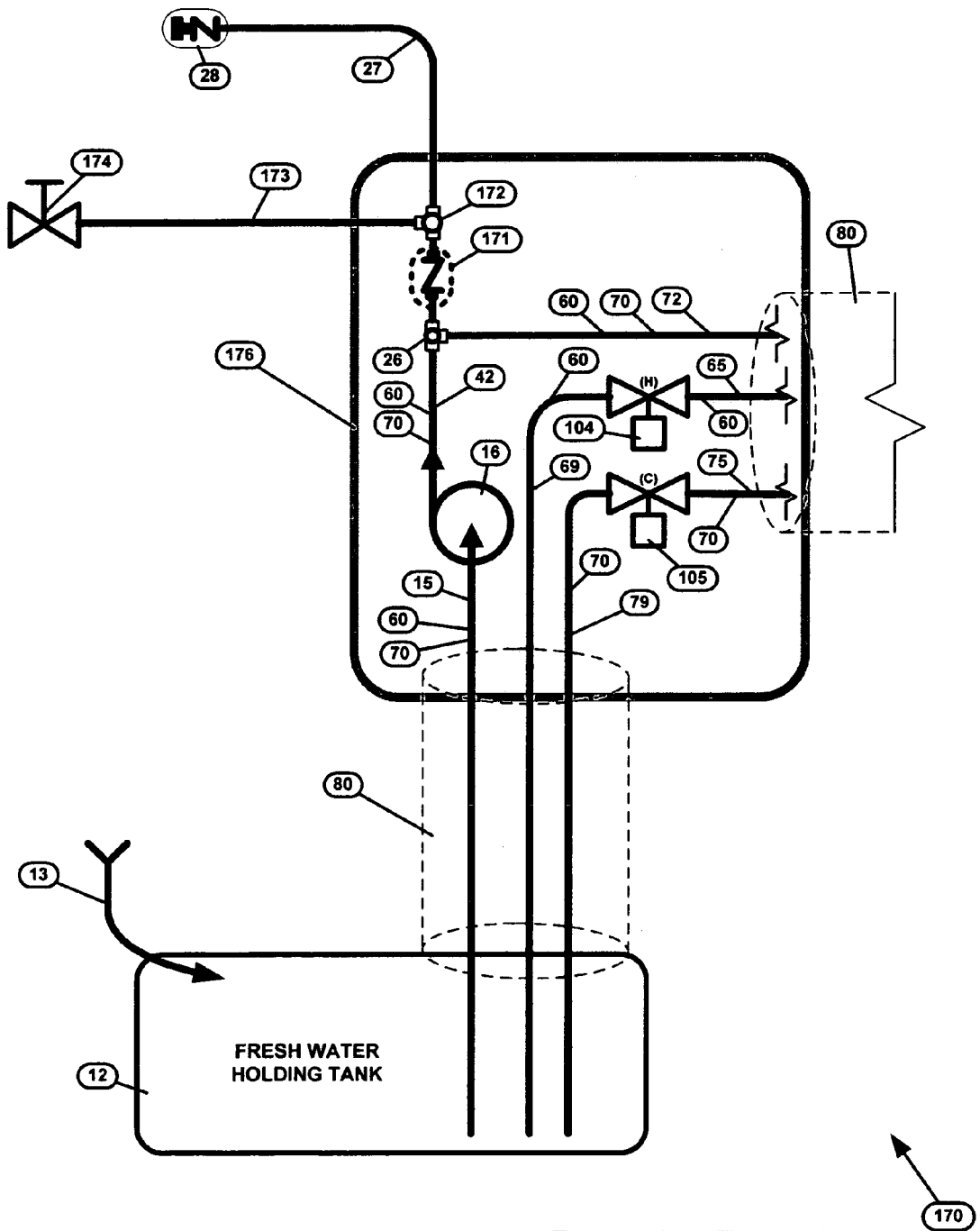
FIG. 6A is a plumbing and equipment schematic showing the city water drain line scheme for the present Warming System for units so equipped.
Figure 6B:
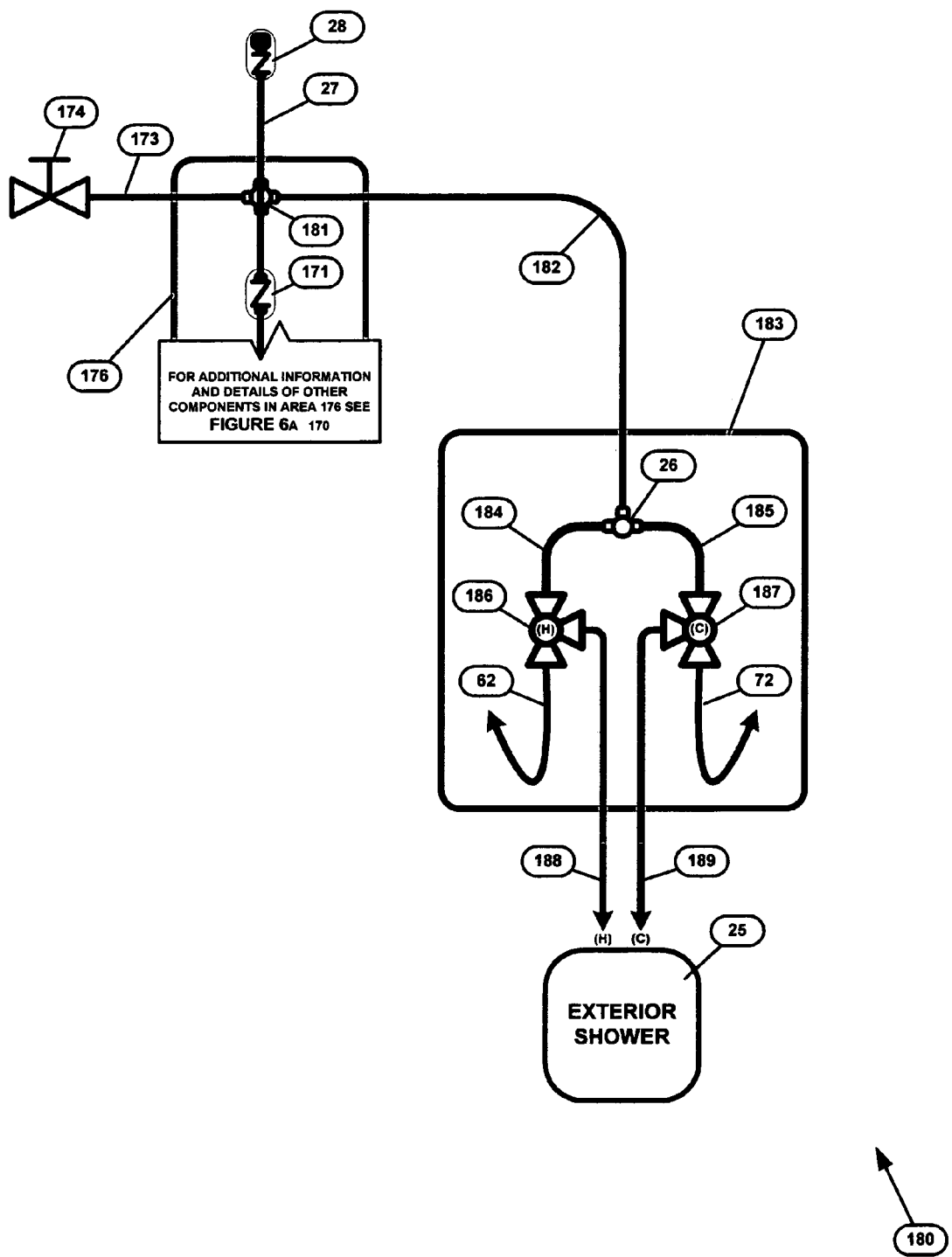
FIG. 6B is a plumbing and equipment schematic showing the exterior shower drain line scheme for the present Warming System for units so equipped.

The city water drain plumbing scheme 170 shown in FIG. 6A and the exterior shower drain plumbing scheme 180 shown in FIG. 6B illustrates possible and practical methods that might be used to isolate and clear water from the on-board city water connector 28, the city water on-board supply line 27 and the external shower 25 and modified exterior shower water supply lines 188 and 189 for units that are so equipped.

Electrical Control

The warming system 50 control is simple and logical for the customer. The customer can easily operate the warming system 50 because it requires only a single control switch for both the basic control circuit 110 shown in FIG. 2 and the master control circuit 130 shown in FIG. 3 to activate warming.

In the basic control circuit 110 shown in FIG. 2, the water pump switch 17 automatically powers "ON" the warming system 50 when the pump switched is "ON". Only one additional switch (SW-1) 111, labeled bypass "ON" is required to bypass the thermostats 101 (TH-1) and 102 (TH-2,) and power the solenoid valve 104 (SV-1) and 105 (SV-2) open so the warming system circulating lines 60 and 70 can be "winterized" for the winter season and "flushed" for the warm weather season use. The bypass control switch 111 is connected to the water pump power switch 17 so they should be located close to each other for simple wiring and owner convenience. There is no other interconnecting of existing equipment required.

In the integrated master control circuit 130 shown in FIG. 3, the pump switch 17 can be turned "ON" without automatically activating the warming system 50. This allows the water pump 16 to be operated in cooler temperatures that would otherwise cause the warming system 50 to activate, but not cold enough to be concerned with the on-board water system freezing when warming would not be necessary. The master control circuit switch 131 is interconnected to the water pump switch 17 to automatically power the water pump 16 "ON" when switch 131 is in either the auto warming "ON" or bypass "ON" position.

The integrated master control circuit 130 allows for independent control of the warming system 50 without having to turn "ON" the water pump power switch 17, therefore there is an additional indicator light (LED-3) 136 that shows when the warming system is operational and that the water pump 16 and the warming system 50 are both powered "ON".

In both the basic control and the master control wiring circuits 110 and 130, there are solenoid valve activation indicator lights (LED-1) 114 and (LED-2) 115, to show when either or both solenoid valves (SV-1) 104, and (SV-2) 105, are powered and warming is in progress. LED-1 indicates that the freshwater holding tank is being warmed and LED-2 indicates that the water lines are being warmed.

Warming System 50, 150, and 200 Control Circuit Options

In both control circuits 110 and 130 there is bypass alert option 119. Option 119 electrical components and wiring are shown in FIG. 10. Circuit 119 includes a blinking indicator light (LED-B 1) 141 and a piezo electric buzzer (PEB-1) 142. A visual and audible alert would sound only when the bypass switch 111 in circuit 110 is turned "ON" or in circuit 130 when the warming system 50 switch 131 is in the bypass position indicating that the solenoid valves 104 (SV-1) and 105 (SV-2) are energized required for winterizing and flushing the water system. This feature will signal an alert if someone would accidentally activate the warming system bypass function when not "winterizing" or "Flushing" the water system 50. The bypass alert circuit 119 would be very important especially if the bypass were accidentally turned "ON" when the unit is parked for even a few hours. This condition would cause the water pump 16 to continually run, the water heater 14 to continually cycle and excessively heat the water in holding tank 12 as the solenoid valves 104 and 105 would be powered constantly open.

In either the basic or master control circuit 110 or 130, it would not be unusual for both solenoid valve indicator lights to be "ON" when the warming system 50 is operating, therefore the optional bypass alert 19 would eliminate any confusion whether the bypass is "ON".

The master control circuit 130 can include a low temperature alert circuit 144 as shown in FIG. 10. This circuit 144 requires only three additional electrical components. These electrical components are: diode (D-3) 145, blinking indicator light (LED-B2) 146 and a piezo electric buzzer (PEB-2) 147. This alert is activated only when the pump 16 is turned "ON" and any warming system thermostat sensor (TH-1, TH-2, etc.) is calling for warming but the warming system 50 is not turned "ON". The buzzer 147 could be annoying at night when people are sleeping and the water pump 16 is turned "ON" for whatever use but warming may not be required, so the piezo electric buzzer (PEB-2) 147 may be muted to a low audible level or just the "blinking LED light" (LED-B2) may be used.

City Water Inlet Line Protection

For most RV units that are equipped for city water connection use a city inlet connector that has an integrated check valve 28 there are two methods of resolving the freezing of this connector 28 and the city water supply line 27. The simplest, least costly and practical method is to isolate the on-board city water supply line. This can be accomplished by adding a "tee" 172 and a drain line 173 and terminating the drain line with drain valve 174, shown in drawing 170, FIG. 6*a*. To isolate the city water line install the "tee" connector 172 between the on-board end of the city water supply line 27 and the input side of the check valve 171. You would then connect the drain line 173 to the "tee" connector 172 and terminate the drain line with a drain valve 174 at a convenient location so the draining water could just run onto the ground.

The check valve 171 and "tee" connector 172 must be located within the warm interior or in an area 176 where they can be insulated and protected by the warming system loop circulating lines 60 and 70 shown in FIG. 6A. Whether the water system check valve 171, solenoid valves 104 and 105, water pump 16 and drain line "tee" connector 172 are located inside the RV unit 206 or outside the RV unit 208 a thermostat (i.e. TH-3) 103, may be necessary to monitor the temperature and warm these plumbing components to insure freeze protection. This thermostat 103 will activate the cold water warming circulating solenoid (SV-2) 105 when warming is required. As the hot water loop circulating line 60 used to heat the water in the fresh water holding tank is bundled with cold water loop circulating line 70 it also provide warming of the plumbing components located in 176 shown in FIG. 6A.

Installing a garden water hose faucet at the end of the city water drain line 173, instead of using a less expensive standard drain valve 174, would be a benefit and a real convenience for many RV owners. This would eliminate having to carry special water adapters, a diverter or a hose faucet on the RV.

Because of drain line routing, it may not be applicable to clear out water in the city water drain line by gravity. By using an off-the-shelf blow out adapter plug that is connected to the city water inlet connector allows compressed air to be used to clear out any water from the on-board city water line. An overview of the drain line addition is shown in 170, FIG. 6A.

When using compressed air to clear out water from the on-board city water line, air can get into the water system supply lines through the check valve. This should not be of concern as any trapped air would be bled-off simply by opening a faucet on the water fixtures. RV owners who use blow out adapter plug would be familiar with bleeding air out of the water system when winterizing or flushing out their water system or when they connect up to city water.

There could be a concern both by the manufacturer and the RV owner of potential of over pressuring the units' water system when using compressed air. Over pressure concerns can be eliminated using a standard air pressure regulator, set to the appropriate pressure, and connecting the regular between the city water blow out adapter plug and the compressed air source.

There are several off-the-shelf compact 12-volt DC air compressors equipped with a reserve air tank and shut-off pressure switch that could be provided and installed by the manufacturer or purchased and installed by the customer. This would be a very useful accessory that would serve three functions:

1) Provide an on-board source of compressed air to blow out the water lines required to isolate the exterior shower and the city water line, any time, any where.

2) This would be convenient when winterizing and when on trips to inflate air mattresses, beach balls, inner tubes, rafts, etc.

3) Being these compressors deliver over 100 psi they can easily inflate high-pressure vehicle and trailer tires.

The second method would be more costly, not just in materials but also in labor. When the plumbing approach shown in 170, FIG. 6A is not an option, the on-board city water supply line 27 and the city water inlet connector 28 can be protected by the warming system loop circulating lines 70 and/or 60 and would require the inlet connector itself to be in some kind of insulated recessed compartment.

Exterior Shower Protection

Those RV units equipped with exterior shower water fixture 25 FIG. 7, seemed to present real problems as they can be located anywhere on the unit and generally are directly exposed to outside temperatures. The exterior shower water fixture can be located in non-insulated storage compartments or enclosed in non-insulated flush-mounted shower compartment hatches. Even though most exterior showers have vacuum breakers or anti-siphon devices, water is still in the shower valve, shower head and supply lines.

Extending the warming system 50 water circulating lines 60 and 70 plus insulating any type of exterior shower compartment is not a practical or cost-effective way to protect the exterior shower from cold weather freezing.

In cold weather conditions the entire on-board fresh water system would normally be winterized which renders the fresh water supply system totally unusable. Having the most basic and essential convenience, a usable on-board running water supply during the colder months in exchange for giving up the use of the exterior shower for most RV owners offers a real and significant advantage. The major advantage is to greatly extend the RV travel season by months and travel areas without worrying about the water system freezing or having to winterize the water system for moderately cold freezing temperatures down to 10° F.

So a logical and practical approach to resolve this dilemma is to provide an economical and reasonable way to isolate the exterior shower and clear all water from the shower water supply lines, shower valves and head. Isolating the exterior shower can be accomplished by simply routing a modified hot water 188 and cold water 189 exterior shower water supply lines into the interior and connecting each line to a manual 3-way "bypass" valves so the shower supply lines can be isolated and drained; shown in 180, FIG. 6B. Most RV units equipped with an exterior shower are also equipped with a city water supply connection therefore the exterior shower overview drain scheme shown in 180, FIG. 6B, also shows the city water drain scheme plumbing components.

As the 3-way valves, 186 (hot water) and 187 (cold water), must be conveniently accessible for the owner to operate. These 3-way valves can be located near an inside water fixture where both the hot and cold water supply lines are accessible such as in the cabinet under the galley sink or in the interior shower area. As the exterior shower modified water supply lines 188 (hot water) and 189 (cold water) must come from inside the unit where the 3-way valves are located. The 3-way valves are connected so that the exterior shower modified water lines can be switched between inside modified water header/supply lines 62 (hot water) and 72 (cold water) to the on-board city water supply drain line 173. These valves could be marked or labeled "Exterior Shower Isolation Valves" and designated as "hot" water valve and "cold" water valve with the valve positions marked or labeled as "supply" and "drain".

When the 3-way shower isolation valves, 186 and 187, are turned to the water supply position the modified exterior shower water supply lines, 188 ands 189, are then connected to the on-board modified water header/supply lines, 62 and 72 respectively will connect the exterior shower water fixture 25 to the water supply lines as shown in FIG. 6B.

When the 3-way valves are turned to the "drain" position the modified exterior shower water supply lines 188 and 189 are then isolated from modified water header/supply lines 62 and 72 and are then connected to the exterior shower valve drain lines 184 and 185 respectively. To facilitate connecting both valve drain lines 184 and 185 to drain line 173 the valve drain lines are connected together near the 3-way valves 186 and 187 with a "tee" connector 26 to the exterior shower drain line 182. Exterior shower drain line 182 then connects to a 4-way "cross" line connector 181 which replaces the "tee" connector 172 shown in FIG. 6A The "cross" connector 181 ties together the city water supply line 27, the city water drain line 173, the external shower drain line 182 and the city water side of the inline check valve 171. By using an off-the-shelf blow out adapter plug connected to the city water inlet connector, compressed air can be used to clear out any water from both the exterior shower and the on-board city water line.

There are 12 volt dc electric powered dual 3-way valves available that would allow the valves to be remotely located and controlled with an electrical switch.

Operation of Warming System 50, 150 and 200

Although the warming system 50 operation should be apparent from the above description, the following example of a step-by-step procedure for units equipped with city water connection and exterior shower is provided below. The procedure includes isolating and draining of the on-board city water line and the exterior shower (for units so equipped) to assist the reader in understanding the proper preparation and operating of the warming system. The following instruction may be incorporated in the RV user manual and/or affixed to the inside of a cabinet door or other appropriate location.

Instruction for Cold Weather Operation

1. Disconnect city water supply hose from the RV water inlet connector.

2. Turn "off" the water pump then open the water line drain valve.

3. Turn the exterior shower bypass valves to the drain position

4. Connect the blow out air plug adapter to the city water inlet connector.

5. Apply compressed air to the blowout adapter until there is no water coming out of the line drain valve then stop applying compressed air to the blowout adapter.

6. Turn off the line drain valve and open the exterior hot and cold water shower faucet valves.

7. Apply compressed air to the blowout adapter until there is no water coming out of the exterior shower water fixture then stop applying compressed air to the blowout adapter and close the water shower faucet valves.

8. To insure water is completely cleared out of the lines repeat steps 4 through 7.

9. Remove the blowout adapter from the city water connector fitting and secure the city water connector cap cover protector, then stow the exterior shower hose properly.

10. Check and fill the fresh water holding tank if less than ⅓ full, but Do Not over-fill, as water can freeze in the tank fill line.

11. If gray and black water holding tanks are ⅓ full then flush and dump the waste and add RV antifreeze to the black and gray water holding tanks as directed on the RV antifreeze label or see chart in owners manual.

12. Turn "ON" the warming system when the outside temperature is expected to fall below 35° F. or turn and leave the warming system "ON" whenever the RV is plugged into external electrical power source and/or is to be parked for a few days or weeks between trips.

Winterizing the Warming System

When winterizing, follow the instructions in the manufacturer's owner's manual and set the warming system switch in the bypass "ON" position when pumping antifreeze through the water lines. After completing the water lines and water fixture procedure, leave the bypass and pump switched "ON" for an additional 3 minutes then turn off the warming system bypass switch and the pump switch. Follow the instructions in the manufacturer owners manual regarding the LP-gas, battery and other procedures that must be completed before closing the unit up for storing Flushing the Water System When flushing out the water system and holding tank follow the instructions in the manufacturers owners manual and turn the warming system bypass switch "ON" when flushing out the antifreeze from the lines and water fixtures. After completing the initial water lines and water fixture procedure, leave the bypass and pump "ON" for an additional 3 minutes then turn off the warming system bypass switch and the pump. Then drain and fill the fresh water holding tank as the warming circulating lines will have flushed some of the RV antifreeze into the fresh water holding tank during the initial flushing. Follow the instructions in the manufacturer owners manual regarding the LP-gas, battery and other procedures that must be completed before putting the unit in service.

Because the gray and the black water holding tanks will have different holding capacity a chart showing how much RV antifreeze is required to add in each holding tank for a given temperature range could be included in the owners manual. For example; a 10 gallon black tank and a 20 gallon gray tank could show a chart as follows:

0 to 10° F.=4 gallons in black and 8 gallons in gray tank
   10 to 20° F.=3 gallons in black and 6 gallons in gray tank
   20 to 32° F.=1 gallons in black and 3 gallons in gray tank RV Equipment Requirements for Warming System Equipped Units 1. A 12 volt electric water pump; preferably a variable speed pump as they are more efficient and mush more quiet running especially at the Warming Systems low water flow rate (no pump "ON" and "OFF" cycling during the warming period)

2. A water heater, gas/electric so when the RV unit is plugged into an external electrical supply the water heater will not require any on-board LP-gas. If the RV unit is a motor home, preferably a gas/electric equipped with engine heat exchanger that allows the excess engine heat to heat the water and does not require LP-gas when the vehicle engine is running.

3. A heavy-duty 12 volt deep-cycle rechargeable house battery; ideally a lead cobalt battery. A lead cobalt battery can store up to four times the energy, pound for pound, in the same size package as a standard lead acid battery plus can be fully charged in about an hour. At this time the lead cobalt battery is about four times the cost of a lead acid battery but it would take about four lead acid batteries to provide the same power capacity.

4. A 120 volt power converter/charger to supply 12 volts to the low voltage on-board equipment such as the water pump, warming system solenoid valves furnace, etc. and also keeps the house battery charged when the RV unit is parked for a few days or weeks between trips when the unit is plugged into an external power source.

5. A LP-gas furnace with enough heating capacity to keep the interior temperature comfortable when the unit is occupied during cold weather.

That when the unit may be unoccupied and not plugged into an external electrical source for an extended period of time that exceeds the batteries capacity to operate the warming system and furnace (i.e. 8 hours@20° F. outside temperature) a generator will have to run periodically to charge the on-board house battery charged.)

6. Insulated adequately to prevent excessive heat loss especially when the RV unit is operating only from the on-board fuel and battery to save on LP-gas and battery drain. Preferably insulated enough so that a small fan type high efficiency, electrical space heater can protect the interior water fixtures from freezing when the unit is plugged into an external power when the outside temperature drop down to between 10 and 15° F. If an electrical space heater can not keep the interior 25 to 30° F. warmer than outside air temperatures then the furnace can be turned "ON" with the thermostat set to assist in heating the interior. Test done on a Roadtrek 200, class "B" motor home in the winter months of 2004/2005 with a small ceramic heater set to low heat setting (750 watts) kept the interior of the unit about 30° F. warmer than the out side temperature that was as low as −10° F. (at −10° F. the inside temperature was at 18° F.) without closing the curtains or using a ceiling fan insulating cover.

The wattage of the space heater plus the wattage of the gas/electric water heater and other equipment that might add load must not exceed the unit's maximum external electrical current capacity. For example, a typical 30, 120 volt equipped RV unit plugged into a 30 amp receptacle could easily handle a 1,200 watt gas/electric water heater, a 150 watt charger/inverter load including furnace fan and a 1,500 watt electrical space heater operating simultaneously.

As an example of worse case situation would be some one plugging in a 30 amp RV system into a 20 amp receptacle, using a common standard adapter because there is not a 30 amp receptacle available, then the maximum space heater load would be 1,000 watts with very little safety margin. Using the scenario of a 15 amp supply limit on a 30 amp RV system would not be all that unusual, so a 750 watt, high efficiency, 120 volt forced air ceramic type electric space heater should be used to test the low temperature limit when using only 15 amp external electrical power. Although a dual wattage space heater could be used (i.e. 750 watt low and 1,500 watt high) to adjust for a 30 amp equipped unit to be operated on a 20 amp or 30 amp circuit; using a dual wattage space heater a stipulation as to the low temperature limit when connected to a 20 Amp circuit would have to be noted in the owners manual. Such stipulation regarding the warming system operating from external AC only might state for example: The low temperature limit is "0° F." when connected to a "30 Amp" service with the space heater set in the high heat position (1,500 watt setting). 2) The low temperature limit is 10° F. when connected to a "20 Amp" service with the space heater set in the low heat position (750 watt setting).

The manufacturer should have a safety factor built in when establishing the published low temperature limit. For example if the RV unit equipped with the warming system can handle a minimum outside temperature of −10° F., then a good safety margin would be a published figure of 0° F. If the minimum outside temperature limit is 0° F. then an excellent safety margin would be a published figure of 10° F. Another consideration is who would want to be "winterizing" the water system themselves in 0° F. temperatures unless the owner would be willing to have an RV dealer who can winterize the unit inside their heated facility.

As noted before, with only a 15 or 20° F. low temperature limit the vast majority of RV owners and potential buyers would be very impressed and pleased if they could be free from the worry of water system freezing and to extend the RV season by months. It is important to keep the warming system price down and not to over-design for the lowest possible temperature limit the system may be capable of providing. Estimating the manufacturer's parts and labor cost of equipping an average RV unit with the warming system at about $400 to extend the RV season by three or more months should be very attractive to many people if the added sales price is kept under $1,000 or $2,000 range.

Items Manufacturers Could Offer with Warming System Equipped Units

Optional equipment that the manufacturer might consider offering as standard equipment (or for added cost) with a warming system equipped units is:

1. Built-in, high efficiency, 120 volt forced air ceramic type electric space heater.

2. A modified warming system control that would automatically power a built-in electric space when the warming system is turned on and the RV unit is plugged into an external electrical power source.

3. Heavy fabric insulating curtains material with Velcro or snap fasteners on the curtain edges to help seal the curtains against the window frame for better heat loss protection.

4. Thermal insulating ceiling vent cover. (an off-the-shelf item)

5. RV door window insulating solar cover. (an off-the-shelf item)

6. Dual display digital thermometer, to monitor the fresh water holding tank water temperature and the inside and/or outside temperature.

7. Compact 12-volt air compressor with air storage reserve tank (off-the-shelf item) mounted in an outside storage compartment. (To prevent someone from accidentally leaving the compressor "ON", a simple and inexpensive countdown timer relay module activated by an electrical switch could be added that would turn "OFF" the compressor after a set period of time. For motor homes, an off-the-shelf air compressor with an air storage reserve tank are available that mount under the hood, in the engine compartment that may be integrated into the city water inlet connector line.

A single hot water loop 60 warming system could be employed if the RV unit has a very basic water system where only the holding tank 12 and the water pump intake line 15 would be exposed to the freezing outside environment 208. In a single hot water loop warming system all water fixture plumbing lines would have to be run within the interior and routed as to protected from freezing when the RV unit would be parked for even a few days in moderately freezing temperatures. A single hot water loop 60 warming system would be very limited as to the time exposed to freezing temperatures and to how low the temperature falls below freezing. Such a single loop system would be only marginally practical at best under very limited conditions. A dual loop warming system would offer the greatest versatility and reliability under a much wider range of cold environmental conditions adding months to the RV season and providing a great incentive for a new found freedom.

While the invention has been described with reference to a preferred embodiment, it will be understood by those skilled in the art that various changes may be made and equivalents may be substituted without departing from the broad aspects of the invention.

I claim:

1. A recreational vehicle water warming and circulating apparatus for a recreational vehicle having an on-board water supply including cold water and heated water, the water supply having an exposed portion in thermal communication with outside air and having a water temperature affected by outside air temperature, particularly when the outside air temperature falls to near the freezing point of water and below, said recreational vehicle water warming and circulating apparatus comprising:

a holding tank having a chamber to hold the cold water of the water supply;

a pump having intake and discharge openings, said pump drawing cold water from said holding tank and pressurizing the cold water and heated water downstream of said pump;

a water heater for producing the heated water, said water heater having a cold water inlet and a heated water outlet, said water heater receiving water from said pump;

a water fixture having at least one manual valve to selectively dispense the cold water and heated water of the water supply, said water fixture being located inside the recreational vehicle;

a heated loop including a heated supply line providing a flow path from said holding tank through said pump and water heater to said water fixture, and a heated return line providing a flow path from said water fixture back to said holding tank, said heated supply line supplying the heated water to said water fixture and said heated return line returning undispensed heated water to said holding tank;

a heated loop flow control valve positioned along said heated return line, said control valve being operable to selectively open and close said flow path of said heated return line;

a control circuit including a water supply temperature sensor with a sensing element positioned to determine when the cold water in the exposed portion of the water supply reaches one of either a lower temperature setting and an upper temperature setting, said control circuit selectively opening and closing said heated loop flow control valve to allow and stop a flow of heated water through said heated loop, respectively; and, wherein said control circuit opens said heated loop flow control valve to allow the heated water to flow through said heated loop when said water supply temperature sensor senses the cold water of the water supply has reached said lower temperature setting, said pump pumping water from said holding tank to said water heater and circulating the heated water through said heated loop and to said holding tank, and wherein said control circuit closes said heated loop flow control valve when said water supply temperature sensor senses the cold water of the water supply has reached said upper temperature setting.

2. The recreational vehicle water warming and circulating apparatus of claim 1, and further comprising:

a cold loop including a cold supply line providing a flow path from said holding tank through said pump to said water fixture, and a cold return line providing a flow path from said water fixture back to said holding tank, said cold supply line supplying the cold water to said water fixture and said cold return line returning undispensed cold water to said holding tank;

a cold loop flow control valve positioned along said cold return line, said cold loop control valve being operable to selectively open and close said flow path of said cold return line;

said control circuit including a cold loop temperature sensor with a sensing element located along said cold loop to determine when said cold loop reaches one of either a second lower temperature setting and a second upper temperature setting, said control circuit selectively opening and closing said cold loop flow control valve to allow and stop a flow of cold water through said cold loop, respectively; and, wherein said control circuit opens said cold loop flow control valve to allow water flow through said cold loop when said cold loop temperature sensor senses said cold loop has reached said second lower temperature setting, said pump pumping water from said holding tank and circulating the cold water through said cold loop and back to said holding tank, and wherein said control circuit closes said cold loop flow control valve when said cold loop temperature sensor senses said cold loop has reached said second upper temperature setting.

3. The recreational vehicle water warming and circulating apparatus of claim 2, and wherein said water heater has a heating tank, said water heater heating and storing a supply of the heated water in said heating tank, said water heater heating the heated water in said tank to within a desired temperature range.

4. The recreational vehicle water warming and circulating apparatus of claim 3, and wherein said pump has an associated pressure sensor for sensing when water downstream said pump reaches one of either an upper pressure limit and a lower pressure limit, said pump activating when said pressure sensor senses that the water pressure downstream said pump has reached said lower pressure limit, and said pump deactivating when said pressure sensor senses that the water pressure has reached said upper pressure limit.

5. The recreational vehicle water warming and circulating apparatus of claim 4, and wherein said pump has a manually operated on/off switch that places said pump into one of either an operating mode and a non-operating mode, said pump further including a second switch to activate and deactivate said pump, said pump being activated when said on/off switch places said pump in an operating mode and said pressure sensor senses that the water pressure has reached said lower pressure limit.

6. The recreational vehicle water warming and circulating apparatus of claim 2, and further comprising a second water fixture, the heated supply line of said heated loop supplying the heated water to said water fixtures in series, and said cold supply line of said cold loop supplying the cold water to said water fixtures in series.

7. The recreational vehicle water warming and circulating apparatus of claim 2, and wherein said heated and cold loops are bundled together into a bundled line having a bundled line temperature, said bundled line being in the exposed portion of the water supply, the water temperatures of the heated and cold water in the bundled line and the bundled line temperature migrating toward the outside air temperature when said water warming and circulating apparatus is inactive, and said cold loop temperature sensor sensing said bundled line temperature;

wherein said control circuit opens said heated loop flow control valve to allow the heated water to circulate through said heated loop and to warm the cold water in said cold loop; and, wherein said control circuit opens said cold loop flow control valve to allow the cold water from said holding tank to circulate through said cold loop and to warm the heated water in said heated loop.

8. The recreational vehicle water warming and circulating apparatus of claim 7, and wherein said water supply temperature sensor is in thermal communication with the cold water in said holding tank, and said cold loop temperature sensor is in thermal communication with said bundled line at a location proximal a cold spot.

9. The recreational vehicle water warming and circulating apparatus of claim 8, and wherein the outside temperature is at or below the freezing point of water of about 32° F.;

said water supply temperature sensor of said holing tank has said first lower temperature setting of about 45° F. and said first upper temperature setting of about 50° F.; and, said cold loop temperature sensor proximal said cold spot has said second lower temperature setting of about 35° F., and said second upper temperature setting of about 40° F.

10. The recreational vehicle water warming and circulating apparatus of claim 9, and wherein said control circuit includes a third temperature sensor in thermal communication with a portion of one of said loops proximal a second cold spot, said third temperature sensor being adapted to determine when said portion of one of the loops proximal said second cold spot reaches one of either a third lower temperature setting and a third upper temperature setting; and,
  wherein said control circuit opens said cold loop flow control valve to allow cold water to circulate through said cold loop when said third temperature sensor senses said portion of one of the loops proximal said second cold spot has reached said third lower temperature setting.

11. The recreational vehicle water warming and circulating apparatus of claim 2, and wherein said heated loop includes at least a portion of said supply line of said cold loop, said cold water inlet of said water heater being downstream of said water fixture, and wherein opening said heated loop flow control valve allows cold water to circulate through said portion of said cold water supply line.

12. The recreational vehicle water warming and circulating apparatus of claim 2, and wherein said cold water inlet of said water heater is upstream of said water fixture, and wherein cold water in said cold water supply line remains non-circulating until one of either said cold water control valve and said manual valve of said fixture is opened.

13. The recreational vehicle water warming and circulating apparatus of claim 2, and wherein said temperature sensors are electrical thermostats.

14. The recreational vehicle water warming and circulating apparatus of claim 2, and wherein said flow control valves are solenoid valves.

15. The recreational vehicle water warming and circulating apparatus of claim 7, and wherein the recreational vehicle has a thermal boundary that defines an interior area of said recreational vehicle, said holding tank and at least a portion of said bundled line being located outside said interior area, and at least one of said water fixture being located inside said interior area.

16. The recreational vehicle water warming and circulating apparatus of claim 15, and wherein said holding tank is in the exposed portion of the recreational vehicle, the temperature of the cold water in said holding tank and said heated and cold water in said bundled line migrate toward the outside temperature when the water warming and circulating apparatus is inactive.

17. The recreational vehicle water warming and circulating apparatus of claim 2, and wherein said control circuit opens and closes said heated and cold control valves in unison for one of either weatherizing and flushing said heated and cold loops.

18. A water warming and circulating apparatus for a recreational vehicle, the recreational vehicle having a holding tank for holding an on-board water supply of cold water and heated water, an exposed portion of the water supply being in thermal communication with outside air and having a water temperature affected by the temperature of the outside air, particularly when the outside air temperature falls to near the freezing point of water and below, a pump with an associated switch to selectively activate and deactivate the pump, the pump drawing the cold water from the holding tank, a water heater having a heating tank, the pump pumping water from the holding tank to the water heater, the water heater heating and storing a supply of the heated water in the heating tank, the water heater heating the heated water to a desired temperature, a water fixture having at least one manual valve to selectively dispense the heated water and the cold water, a heated supply line providing a flow path from the holding tank through the pump and water heater to the water fixture, and a cold supply line providing a flow path from the holding tank through the pump and to the water fixture, said water warming and circulating apparatus comprising:
  a heated loop combining the heated supply line with a first return line, said heated return line providing a flow path from said water fixture to said holding tank, the heated supply line supplying the heated water to the water fixture and said heated return line returning undispensed heated water to the holding tank;
  a first flow control valve positioned along said heated return line, said first control valve being operable to selectively open and close said flow path of said heated return line;
  a cold loop combining the cold supply line with a cold return line, said cold return line providing a flow path from the water fixture to the holding tank, the cold supply line supplying the cold water to the water fixture and said cold return line returning undispensed cold water to the holding tank;
  a second flow control valve positioned along said cold return line, and said second control valve being operable to selectively open and close said flow path of said cold return line;
  a control circuit including a water supply temperature sensor having a sensing element to determine when the exposed portion of the water supply reaches one of either a first lower temperature setting and a first upper temperature setting, and a cold loop temperature sensor having a sensing element to determine when the cold water in said cold loop reaches one of either a second lower temperature setting and a second upper temperature setting, said control circuit selectively opening and closing said flow control valves;
  wherein said control circuit opens said first flow control valve to allow the heated water to flow through said heated loop when said water supply temperature sensor senses the water supply has reached said first lower temperature setting, the pump pumping water from the holding tank to the water heater and circulating the heated water through said heated loop and to the holding tank, said control circuit closing said first control valves when said water supply temperature sensor senses the water supply has reached said first upper temperature setting; and,
  wherein said control circuit opens said second flow control valve to allow the cold water to flow through said cold loop when said cold loop temperature sensor senses said cold loop has reached said second lower temperature setting, the pump pumping the cold water from the holding tank and circulating the cold water through said cold loop and back to the holding tank, said control circuit closing said cold loop control valve when said cold loop temperature sensor senses the cold water in said cold loop has reached said second upper temperature setting.

19. The water warming and circulating apparatus of claim 18, and wherein the recreational vehicle includes a second water fixture, the heated supply line of said heated loop supplying the heated water to the water fixtures in series, and the cold supply line of said cold loop supplying the cold water to the water fixtures in series.

20. The water warming and circulating apparatus of claim 19, and wherein said heated and cold loops are bundled together into a bundled line having a bundled line temperature, said bundled line being in the exposed portion of the water supply, the water temperatures of the heated and cold water in the bundled line and the bundled line temperature migrating toward the outside air temperature when said water warming and circulating apparatus is inactive, and said cold loop temperature sensor sensing said bundled line temperature;
    wherein said control circuit opens said heated loop flow control valve to allow the heated water to circulate through said heated loop and to warm the cold water in said cold loop; and,
    wherein said control circuit opens said cold loop flow control valve to allow the cold water from said holding tank to circulate through said cold loop and to warm the heated water in said heated loop.

21. The water warming and circulating apparatus of claim 20, and wherein said water supply temperature sensor is in thermal communication with the cold water in the holding tank, and said cold loop temperature sensor is in thermal communication with said bundled line at a location proximal a cold spot.

22. The water warming and circulating apparatus of claim 21, and wherein said control circuit includes a third temperature sensor in thermal communication with a second cold spot, said third temperature sensor being adapted to determine when a portion of one of the loops proximal said second cold spot reaches one of either a third lower temperature setting and a third upper temperature setting; and,
    wherein said control circuit opens said cold loop flow control valve to allow cold water to circulate through said cold loop when said third temperature sensor senses said portion of one of the loops proximal said second cold spot has reached said third lower temperature setting.

23. The recreational vehicle water warming and circulating apparatus of claim 18, and wherein said heated loop includes at least a portion of said supply line of said cold loop, said cold water inlet of said water heater being downstream of said water fixture, and wherein opening said heated loop flow control valve allows cold water to circulate through said portion of said cold water supply line.

* * * * *